United States Patent
Shen et al.

(10) Patent No.: US 10,250,312 B2
(45) Date of Patent: Apr. 2, 2019

(54) METHODS AND SYSTEMS FOR MULTI-USER BEAMFORMING

(71) Applicants: Xuemin Shen, Waterloo (CA); Miao Wang, Hamilton (CA); Khalid Aldubaikhy, Waterloo (CA); Osama Aboul-Magd, Ottawa (CA); Yan Xin, Ottawa (CA); Kwok Shum Au, Ottawa (CA); Sheng Sun, Ottawa (CA)

(72) Inventors: Xuemin Shen, Waterloo (CA); Miao Wang, Hamilton (CA); Khalid Aldubaikhy, Waterloo (CA); Osama Aboul-Magd, Ottawa (CA); Yan Xin, Ottawa (CA); Kwok Shum Au, Ottawa (CA); Sheng Sun, Ottawa (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 155 days.

(21) Appl. No.: 15/360,852

(22) Filed: Nov. 23, 2016

(65) Prior Publication Data
US 2018/0145732 A1    May 24, 2018

(51) Int. Cl.
| | |
|---|---|
| *H04W 4/00* | (2018.01) |
| *H04B 7/06* | (2006.01) |
| *H04B 7/0452* | (2017.01) |
| *H04W 72/04* | (2009.01) |
| *H04B 7/08* | (2006.01) |
| *H04W 84/12* | (2009.01) |

(52) U.S. Cl.
CPC ......... *H04B 7/0617* (2013.01); *H04B 7/0452* (2013.01); *H04B 7/0623* (2013.01); *H04B 7/0632* (2013.01); *H04B 7/0695* (2013.01); *H04B 7/088* (2013.01); *H04W 72/0446* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2013/0235807 A1* | 9/2013 | Lee | H04W 16/28 370/329 |
| 2015/0230263 A1* | 8/2015 | Roy | H04W 16/28 455/452.2 |

(Continued)

OTHER PUBLICATIONS

Pass Inc., "iPass wi-fi growth map shows one public hotspot for every 20 people on earth by 2018," Nov. 3, 2014.

(Continued)

*Primary Examiner* — Phirin Sam

(57) ABSTRACT

Methods and systems for simultaneous transmission between a transmitter and a plurality of receivers. The transmitter receives information identifying respective preferred transmission sectors for transmission from the transmitter to each receiver. The transmitter transmits a first multi-user simultaneous transmission to a first set of two or more receivers. The first set of receivers is selected for the first set by identifying that the preferred transmission sectors for transmission to the first set of receivers are included in a first virtual grouping of two or more transmission sectors. The two or more transmission sectors belonging to the first virtual grouping are defined by the transmitter.

19 Claims, 22 Drawing Sheets

(56) References Cited

U.S. PATENT DOCUMENTS

| | | | |
|---|---|---|---|
| 2015/0333894 A1* | 11/2015 | Wang | H04L 5/0073 370/329 |
| 2016/0119043 A1* | 4/2016 | Rajagopal | H04B 7/063 370/329 |
| 2017/0079031 A1* | 3/2017 | Maltsev, Jr. | H04B 7/0491 |
| 2017/0085306 A1* | 3/2017 | Cariou | H04B 7/0452 |
| 2017/0131381 A1* | 5/2017 | Malik | G01S 3/50 |
| 2017/0134900 A1* | 5/2017 | Malik | H04B 17/27 |
| 2017/0187439 A1* | 6/2017 | Park | H04B 7/0617 |
| 2017/0223552 A1* | 8/2017 | Roy | H04W 16/28 |
| 2018/0013474 A1* | 1/2018 | Cordeiro | H04B 7/0413 |
| 2018/0091281 A1* | 3/2018 | Kasher | H04B 17/336 |
| 2018/0131421 A1* | 5/2018 | Chen | H04B 7/0452 |
| 2018/0198508 A1* | 7/2018 | Kasher | H04B 7/0617 |

OTHER PUBLICATIONS

Cisco, "The zettabyte era: Trends and analysis," Tech. Rep. Cisco White paper, 2016.

R. Liao, B. Bellalta, M. Oliver and Z. Niu, "MU-MIMO MAC Protocols for Wireless Local Area Networks: A Survey," IEEE Communications Surveys & Tutorials, vol. 18, pp. 162-183, 2016.

S. Rajagopal, S. Abu-Surra, S. Ramakrishna and R. Taori, "MIMO designs for mmWave wireless LAN systems," in 2014 48th Asilomar Conference on Signals, Systems and Computers, 2014, pp. 1916-1920.

A. Zhou, T. Wei, X. Zhang, M. Liu and Z. Li, "Signpost: Scalable MU-MIMO signaling with zero CSI feedback," in Proceedings of the 16th ACM International Symposium on Mobile Ad Hoc Networking and Computing, Hangzhou, China, 2015, pp. 327-336.

A. Maltsev, "Channel models for 60 GHz WLAN systems IEEE 802.11-09-0344-07ad," Mar. 2010.

* cited by examiner

```
Begin:
1:  for k = 1 to BI do
2:      for S_id = 1 to m do
3:          for j = 1 to V/2 do
4:              if mod(k, 2) = 1 then
                    (first BI)
5:                  if STA_Nj ∈ {((V+2mj-2m)/V) ≤ S_id ≤ ((2mj-m)/V)} then
6:                      PDVG_G1j = PDVG_G1j ∪ {STA_Nj}
7:                  end if
8:                  if more than one STA in PDVG_G1j, ∀j then
9:                      STA_Nj = arg min{PL(dB)}, & allocate not-selected STA_Nj sequentially
10:                 end if
11:             else
                    (next BI)
12:                 if STA_Nj ∈ {((V+2mj-m)/V) ≤ S_id ≤ ((2mj)/V)} then
13:                     PDVG_G2j = PDVG_G2j ∪ {STA_Nj}
14:                 end if
15:                 if more than one STA in PDVG_G2j, ∀j then
16:                     STA_Nj = arg min{PL(dB)}, & allocate not-selected STA_Nj sequentially
17:                 end if
18:             end if
19:         end for
20:     end for
21: end for
END;
```

FIG. 15

Begin:
1:     for $k = 1$ to $BI$ do
2:        for $S_{id} = 1$ to $m$ do
3:           for $j = 1$ to $\frac{v}{2}$ do
4:              if $STA_{Nj} \in \left\{\left(\frac{v+2mj-2m}{v}\right) \leq S_{id} \leq \left(\frac{2mj-m}{v}\right)\right\}$ then
5:                 select $STA_{Nj}$ and $\rightarrow PDVG_{G1j}$
6:              end if
7:              if more than one $STA$ in $PDVG_{G1j}$, $\forall j$ then
8:                 select only $STA_{Nj}$ that has $min\{PL_j[dB]\}$
                     & allocate not-selected $STA_{Nj}$ sequentially
9:              end if
10:             if $STA_{Nj} \in \left\{\left(\frac{v+2mj-m}{v}\right) \leq S_{id} \leq \left(\frac{2mj}{v}\right)\right\}$ then
11:                 select $STA_{Nj}$ and $\rightarrow PDVG_{G2j}$
12:              end if
13:              if more than one $STA$ in $PDVG_{G2j}$, $\forall j$ then
14:                 select only $STA_{Nj}$ that has $min\{PL_j[dB]\}$
                     & allocate not-selected $STA_{Nj}$ sequentially
15:              end if
16:          end for
17:        end for
18:     end for
END;

Fig. 16

METHODS AND SYSTEMS FOR MULTI-USER BEAMFORMING

FIELD

The present disclosure is related to beamforming, in particular use of multi-user multiple-input multiple-output (MU-MIMO) communication in beamforming.

BACKGROUND

The IEEE 802.11ad standard provides very high throughput (up to 7 Gb/s) by using the millimeter wave (60 GHz) technology. Directional antennas have been employed for millimeter wave (mm-Wave) systems, such as described in the IEEE 802.11ad standard, in order to support beamforming (BF) techniques for directional wireless communication. BF is employed to address path-loss, to select the beam sector pair between the transmitter and receiver, and to help increase power consumption efficiency.

Wireless local area networks (WLANs) are expected to move towards denser wireless deployment scenarios, such as stadiums, large office buildings, and airports, with very high data rate applications, such as ultra-high definition video wireless streaming. In such scenarios, interference between neighboring devices could harm performance experienced by individual users. Further, inefficient BF may cause transmission delays or even failure of transmission.

SUMMARY

In various examples, methods for selecting the concurrent stations for simultaneous transmission are described. In particular, such methods may enable simultaneous transmission without adding any further computational overhead to the system. Such methods may improve the average throughput and provide time savings by reducing the beamforming time without adding extra feedback overhead (such as pre-coding schemes) to the system.

In various examples provided herein, a virtual grouping technique is described, which may help to mitigate interference that would otherwise be experienced during simultaneous transmission to multiple stations, by enabling simultaneous transmission to selected stations belonging to orthogonal virtual sectors of a virtual grouping.

In some examples, the present disclosure describes a method for simultaneous transmission between a transmitter and a plurality of receivers. The transmitter receives information identifying respective preferred transmission sectors for transmission from the transmitter to each receiver. The transmitter transmits a first multi-user simultaneous transmission to a first set of two or more receivers. The first set of receivers is selected for the first set by identifying that the preferred transmission sectors for transmission to the first set of receivers are included in a first virtual grouping of two or more transmission sectors. The two or more transmission sectors belonging to the first virtual grouping are defined by the transmitter.

In some examples, the present disclosure describes a transmitter for simultaneous transmission with a plurality of receivers. The transmitter includes a processing device executing instructions to cause the transmitter to receive information identifying respective preferred transmission sectors for transmission from the transmitter to each receiver. The instructions further cause the transmitter to transmit a first multi-user simultaneous transmission to a first set of two or more receivers. The first set of receivers is selected for the first set by identifying that the preferred transmission sectors for transmission to the first set of receivers are included in a first virtual grouping of two or more transmission sectors. The two or more transmission sectors belonging to the first virtual grouping are defined by the transmitter.

In some examples, the present disclosure describes a transmitter for simultaneous transmission with a plurality of receivers. The transmitter includes a software module to receive information identifying respective preferred transmission sectors for transmission from the transmitter to each receiver. The transmitter further includes a software module to transmit a first multi-user simultaneous transmission to a first set of two or more receivers. The first set of receivers is selected for the first set by identifying that the preferred transmission sectors for transmission to the first set of receivers are included in a first virtual grouping of two or more transmission sectors. The two or more transmission sectors belonging to the first virtual grouping are defined by the transmitter.

In some examples, the present disclosure describes a computer readable medium comprising a memory storing thereon computer executable instructions for simultaneous transmission between a transmitter and a plurality of receivers. The instructions, when executed by the transmitter, cause the transmitter to receive information identifying respective preferred transmission sectors for transmission from the transmitter to each receiver. The instructions further cause the transmitter to transmit a first multi-user simultaneous transmission to a first set of two or more receivers. The first set of receivers is selected for the first set by identifying that the preferred transmission sectors for transmission to the first set of receivers are included in a first virtual grouping of two or more transmission sectors. The two or more transmission sectors belonging to the first virtual grouping are defined by the transmitter.

In some examples, the first virtual grouping is defined as a first grouping of two or more virtual sectors, each virtual sector being defined as a respective grouping of two or more adjacent transmission sectors. Transmission from the transmitter to a given virtual sector is orthogonal to transmission from the transmitter to any other virtual sector of the first virtual grouping.

In some examples, when two or more receivers have been identified as belonging to a single virtual sector, only one receiver is selected for the single virtual sector.

In some examples, the multi-user simultaneous transmission to the first set of receivers is part of performing multi-beam refinement simultaneously between the transmitter and the selected receivers.

BRIEF DESCRIPTION OF THE DRAWINGS

Reference will now be made, by way of example, to the accompanying drawings which show example embodiments of the present application, and in which:

FIGS. 15 and 16 illustrate example algorithms that may be used for implementing examples of simultaneous transmissions.

Similar reference numerals may have been used in different figures to denote similar components.

DESCRIPTION OF EXAMPLE EMBODIMENTS

Examples described herein provide a beamforming process, utilizing multi-user multiple-input multiple-output (MU-MIMO) with spatial multiplexing (SM) techniques. These examples may help to improve system throughput and may help to decrease system overhead by reducing the time of the beamforming operation. Examples described herein may be compatible with the IEEE 802.11ad standard. These examples may be particularly useful in a densely deployed WLAN scenario. Although described in the context of beamforming, methods and systems described herein may also be suitable for enabling multi-user simultaneous transmission in other applications.

In various examples described herein, a virtual grouping (VG) technique is used, which may help to mitigate interference that would otherwise be experienced during simultaneous transmission to multiple stations. In the present disclosure, the term "simultaneous transmission" is used to refer to transmissions to two or more receivers during the same time slot.

Figure 1A:
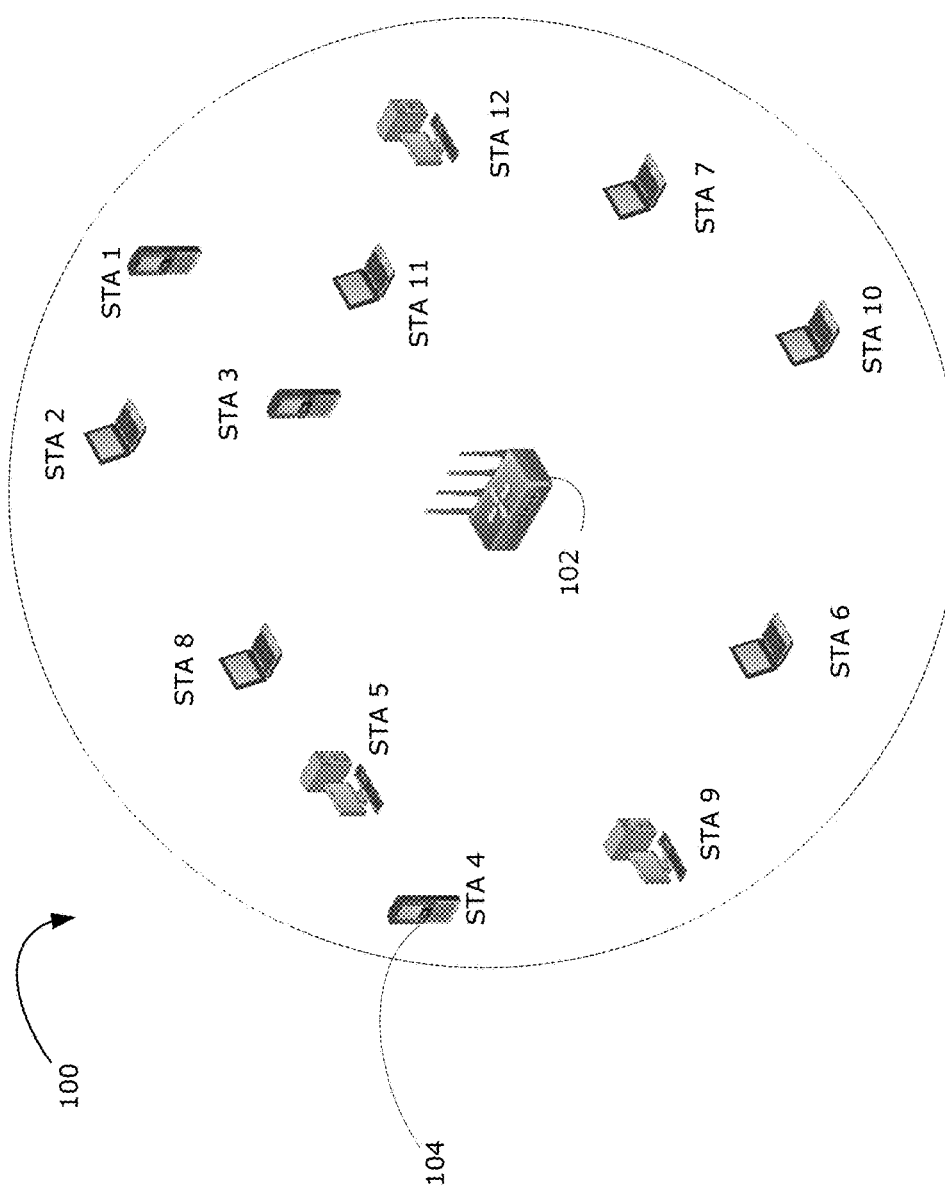
FIG. 1A is a schematic diagram illustrating an example system for multi-user simultaneous transmission.

FIG. 1A is a schematic diagram of an example system 100 in which methods described herein may be implemented. The system 100 shown in FIG. 1 is a wireless local area network (WLAN) including an access point (AP) 102 and multiple stations (STAs) 104 within coverage (indicated by dotted line) of the AP 102. In the example shown, there are 12 STAs, each labeled STA 1 to STA 12 (generally referred to as STAs 104). The AP 102 may be also referred to as a principle control point (PCP) or a base station. The AP 102 may be implemented as a router, for example. The STAs 104 may also be referred to as terminals, user devices, user equipment (UE) or clients, for example. Each STA 104 may be any suitable device capable of wireless communication, including mobile or stationary devices such as smartphones, laptops, mobile phones or tablet devices, for example, and the STAs 104 need not be the same as each other.

The system 100 may support communication between the AP 102 and each STA 104, as well as communication directly between STs 104 (also referred to as device-to-device communication). Using directional antennas, the AP 102 may carry out multi-user transmissions (e.g., transmissions from the AP 102 to multiple STAs 104 simultaneously) by using the spatial reuse technique of MU-MIMO.

Figure 1B:
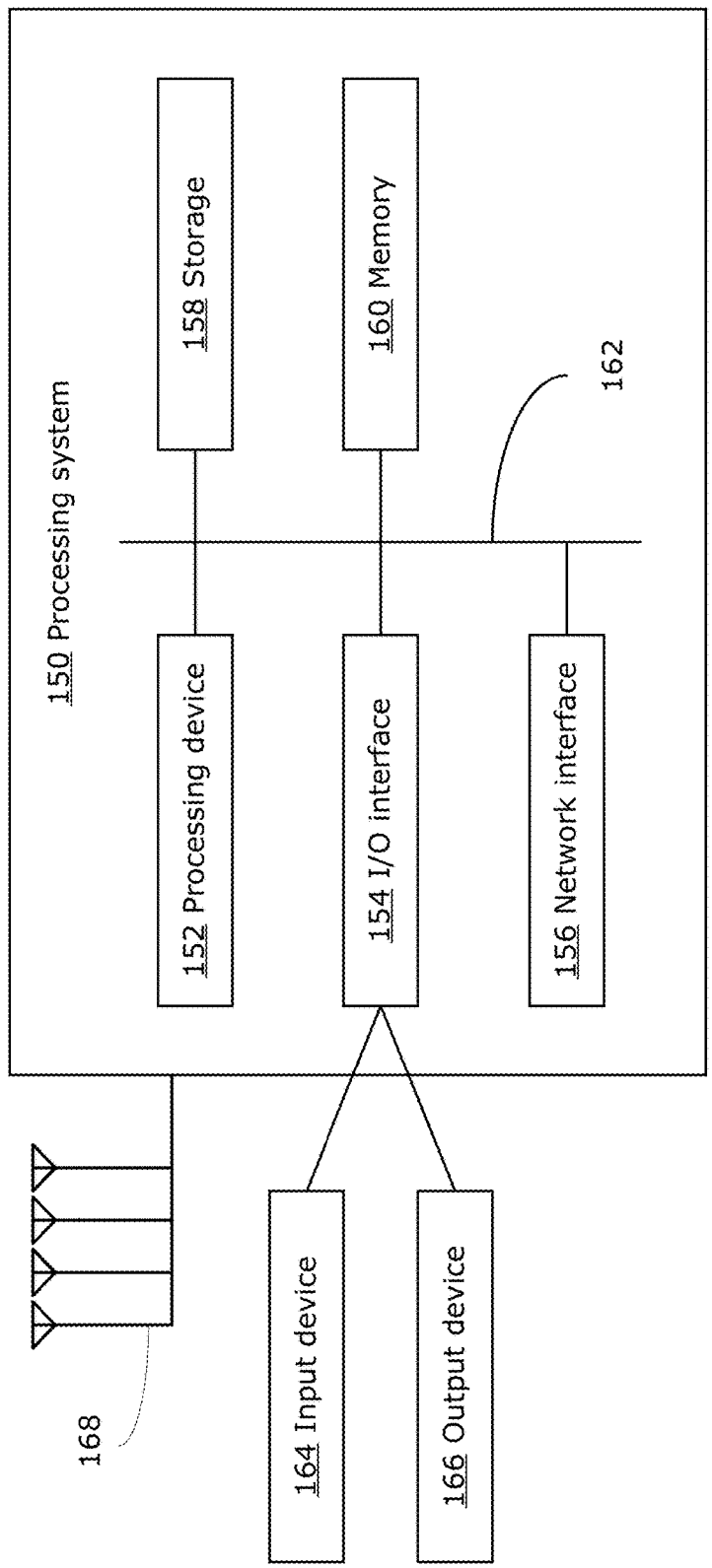
FIG. 1B is a block diagram illustrating an example device suitable for performing multi-user simultaneous transmission.

FIG. 1B is a block diagram illustrating an example processing system 150, which may be used to implement the methods and systems disclosed herein, for example the AP 102 and/or one or more of the STAs 104. Other processing systems suitable for implementing the present disclosure may be used, which may include components different from those discussed below. Although FIG. 1B shows a single instance of each component, there may be multiple instances of each component in the processing system 150.

The processing system 150 includes one or more processing devices 152, such as a processor, a microprocessor, an application-specific integrated circuit (ASIC), a field-programmable gate array (FPGA), a dedicated logic circuitry, or combinations thereof. The processing system 150 may also include one or more input/output (I/O) interfaces 154, which may enable interfacing with one or more appropriate input devices 164 and/or output devices 166. The processing system 150 includes one or more network interfaces 156 for wired or wireless communication with a network (e.g., an intranet, the Internet, a P2P network, a WAN, a LAN, and/or a Radio Access Network (RAN)). The network interface(s) 156 may include wired links (e.g., Ethernet cable) and/or wireless links for intra-network and/or inter-network communications. The network interface(s) 156 may provide wireless communication via one or more transmitters/receivers or transceiver antennas 168, for example. The antennas 168 may act together as an antenna array, in which case each antenna 168 may be referred to as an antenna element or radiating element of the antenna array. There may be a plurality of such antenna arrays. The processing system 150 may also include one or more storage units 158, which may include a mass storage unit such as a solid state drive, a hard disk drive, a magnetic disk drive and/or an optical disk drive.

The processing system 150 may include one or more memories 160, which may include a volatile or non-volatile memory (e.g., a flash memory, a random access memory (RAM), and/or a read-only memory (ROM)). The non-transitory memory(ies) 160 may store instructions (e.g., in the form of software modules) for execution by the processing device(s) 152, such as to carry out the methods described in the present disclosure. The memory(ies) 160 may include other software instructions, such as for implementing an operating system and other applications/functions. In some examples, one or more data sets and/or module(s) may be provided by an external memory (e.g., an external drive in wired or wireless communication with the processing system 150) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 162 providing communication among components of the processing system 150, including the processing device(s) 152, I/O interface(s) 154, network interface(s) 156, storage unit(s) 158 and/or memory(ies) 160. The bus 162 may be any suitable bus architecture including, for example, a memory bus, a peripheral bus or a video bus.

In FIG. 1B, the input device(s) 164 (e.g., a keyboard, a mouse, a microphone, a touchscreen, and/or a keypad) and output device(s) 166 (e.g., a display, a speaker and/or a printer) are shown as external to the processing system 150. In other examples, one or more of the input device(s) 164 and/or the output device(s) 166 may be included as a component of the processing system 150. In other examples, there may not be any input device(s) 164 and output device(s) 166, in which case the I/O interface(s) 154 may not be needed.

The AP 102 and STAs 104 may each include multiple antenna elements 168 forming antenna arrays, and may carry out appropriate beamforming and beam steering controls (e.g., using beamsteering circuits and/or beamsteering control modules implemented by the processing device 152 and processing system 150), in order to carry out directional wireless communication.

To assist in understanding the present disclosure, some basics of the IEEE 802.11ad standard are described below. Although the present disclosure provides examples based on compatibility with the IEEE 802.11ad standard, it should be understood that examples described herein may be implemented in any system, based on any standard, that has beamforming training capabilities.

In IEEE 802.11ad, an analog beamforming mechanism is used in order to achieve appropriate communication link budget for communications between a pair of devices. In order to allow each device to resolve proper antenna weight vector (AWV) settings, the beamforming training is done in a bidirectional training manner for both transmission and reception. The device (e.g., the AP 102) that initiates BF training may be referred to as an initiator, and the other device (e.g., a STA 104) that participates in the BF training with the initiator may be referred to as the responder.

The BF training procedure defined in the IEEE 802.11ad standard is divided into a sector level sweep (SLS) stage and a beam refinement protocol (BRP) stage. In the SLS stage, transmission sectors to be used by the initiator and responder are selected by transmitting AWV training with quasi-omni antenna pattern between the initiator and the responder. Subsequently, in the BRP stage, the initiator and responder refine their sectors by performing iterative refinement of the AWV of both the initiator and responder.

Figure 2:
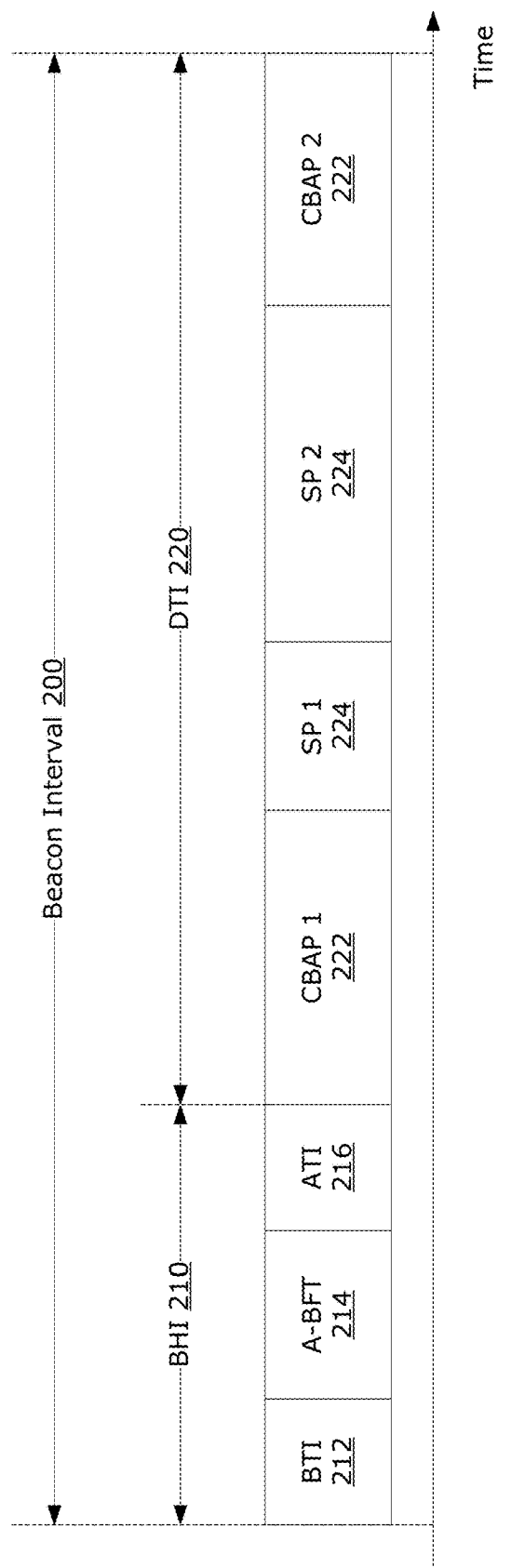
FIG. 2 is a block diagram illustrating different phases during an example beacon interval.

The beacon interval (BI) refers to the basic time frame defined in the IEEE 802.11ad standard. As shown in FIG. 2, a BI 200 may be divided into a beacon header interval (BHI) 210 and a data transfer interval (DTI) 220. The BHI 210 may include a beacon transmission interval (BTI) 212, an association BF training (A-BFT) period 214, and an announcement transmission interval (ATI) 216. The DTI 220 may include multiple contention-based access periods (CBAPs) 222 and/or service periods (SPs) 224. Although FIG. 2 shows CBAPs 222 and SPs 224 in a particular order within the DTI 220, any order of CBAPs 222 and/or SPs 224 may take place during the DTI 220. CBAPs 222 may be enhanced distributed channel access (EDCA) periods and SPs 224 may be schedule access periods. The SLS stage is carried out during the BHI 210, and the BRP stage is carried out during the DTI 220.

Figure 3:
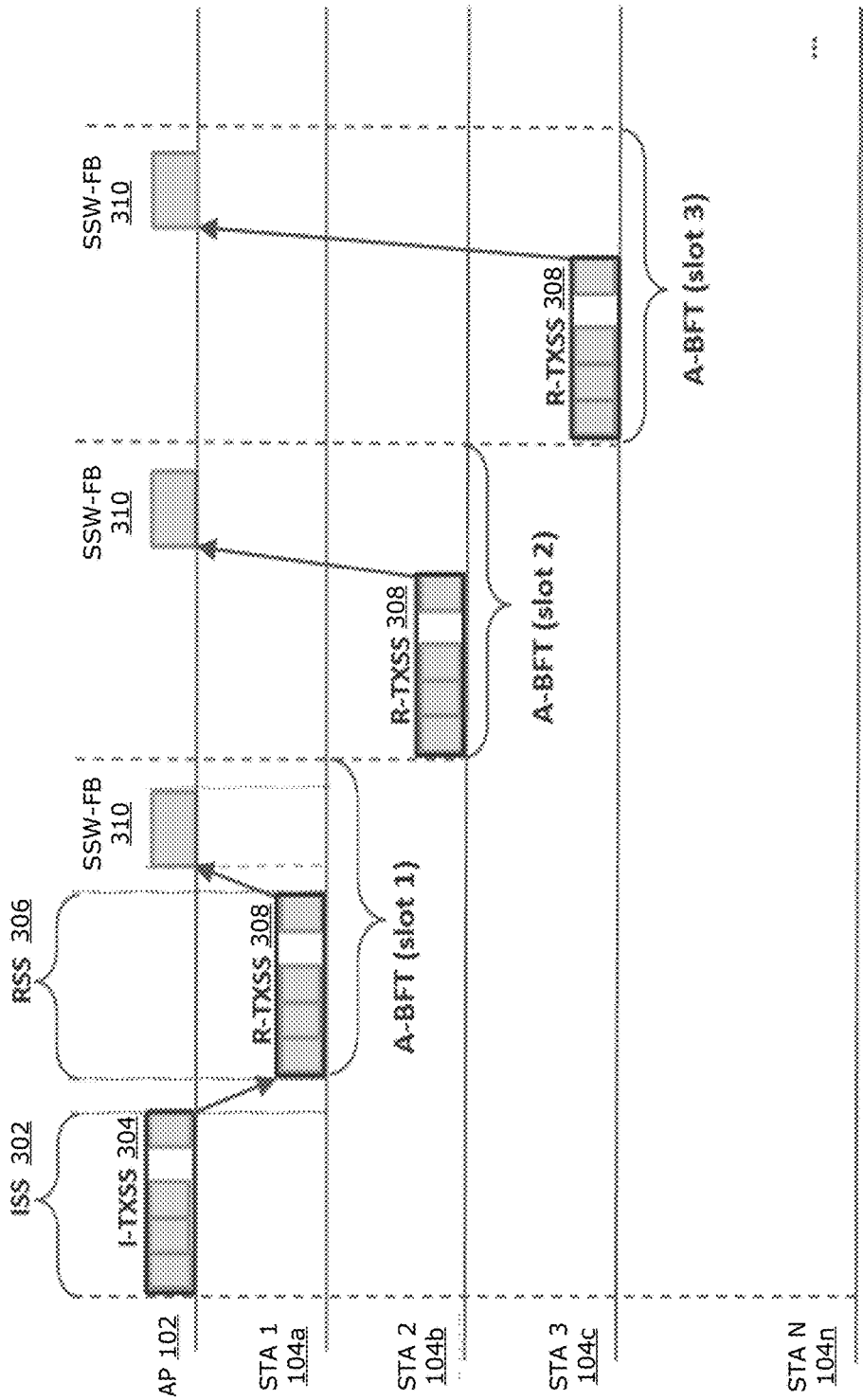
FIG. 3 is a diagram illustrating example communications during a sector level sweep.

FIG. 3 shows an example of the SLS stage carried out between the AP 102 and multiple STAs 104, such as during association of the STAs 104 with the AP 102. In this example, there are N STAs 104, individually labeled as STA 1 104a, STA 2 104b, STA 3 104c . . . STA N 104n (collectively referred to as STAs 104). In the SLS stage, sector sweep (SSW) frames are exchanged between the initiator (in this example, the AP 102) and responders (in this example, the STAs 104).

As shown in FIG. 3, the SLS stage includes an initiator sector sweep (ISS) 302, a responder sector sweep (RSS) 306, and sector sweep feedback (SSW-FB) 310. The SLS stage may also include sector sweep acknowledgement (SSW-ACK), however SSW-ACK is omitted when beamforming is performed during A-BFT 214, as in the example shown. The AP 102, being the initiator, starts the ISS phase 302 by sending an initiator transmit sector sweep (I-TXSS) beacon 304 in different directions during the BTI 212 with quasi-omni antenna patterns. The responder STAs 104 then follow with RSS 306, during which a responder transmit sector sweep (R-TXSS) beacon 308 is transmitted by each STA 104 during the A-BFT 214. The STAs 104 contend for association with the AP 102 over multiple slots available in the A-BFT 214. In the IEEE 802.11ad standard, up to eight slots for association are defined. The STs 104 may contend for one of the slots available during A-BFT 214 via a random access mechanism, for example. In FIG. 3, STA 1 104 transmits its R-TXSS beacon 308 during slot 1 of the A-BFT 214; STA 2 104 transmits its R-TXSS beacon 308 during slot 2 of the A-BFT 214; and STA 3 104 transmits its R-TXSS beacon 308 during slot 3 of the A-BFT 214.

The beacons 304, 308 transmitted during the ISS 302 and RSS 306 each include a plurality of sector sweep (SSW) frames (corresponding to the plurality of sectors defined for directional communication). Each of the SSW frames are sent using a directional beam in a specific one of the sectors, and are used to determine the preferred transmission sector, based on the signal power of each SSW frame received (e.g., the sector having the best signal-to-noise ratio (SNR) may be selected as the preferred transmission sector). SSW-FB 310 follows each RSS 306, and also takes place during A-BFT 214. The AP 102 uses information received from the R-TXSS beacon 308 to enable association of the STA 104.

During ISS 302, each STA 104 determines the preferred AP transmission sector to be used by the AP 102, and the preferred AP transmission sector is reported by each STA 104 via the respective R-TXSS beacon 308 from each STA 104. During each RSS 306, the AP 102 determines the preferred STA transmission sector to be used by the respective STA 104, and the preferred STA transmission sector is reported by the AP 102 to the respective STA 104 via the SSW-FB frame 310. At the completion of the SLS stage, the initiator (in this case, the AP 102) and responders (in this case, STAs 104 that responded during the A-BFT 214) have information identifying their respective preferred transmission sectors (which may be represented as AWVs).

Figure 4:
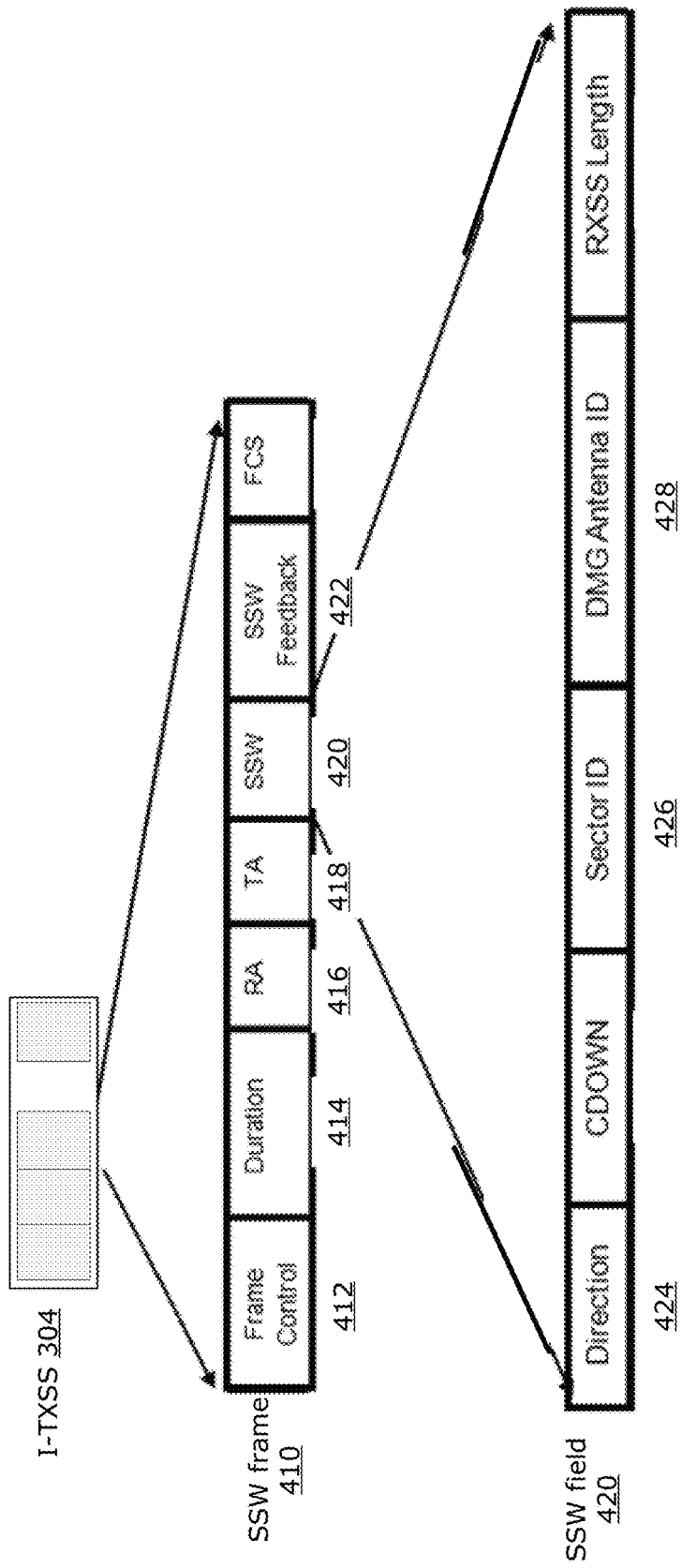
FIG. 4 is a block diagram illustrating an example sector sweep frame.

The SSW frames and SSW-FB frames are communicated in the SLS phase between an initiator and responder in order to perform coarse beamforming training. The I-TXSS beacon 304 contains several SSW frames. The format of the I-TXSS beacon 304, as defined in the IEEE 802.11ad standard, is now discussed, with reference to FIG. 4. The I-TXSS beacon 304 includes a plurality of SSW frames 410 (one SSW frame 410 per transmit sector), one of which is shown in detail. The SSW frame 410 includes a Frame Control field 412 and a Duration field 414. Each SSW frame 410 also contains data (e.g., MAC addresses) identifying the receiver and the transmitter of the SSW frame 410, for example in the receiver address (RA) field 416 and the transmitter address (TA) field 418. The SSW frame 410 also includes a SSW field 420 and a SSW Feedback field 422. The SSW frame 410 also contains additional fields, as shown in FIG. 4, which will not be described in detail here.

The SSW field 420 contains a Direction field 424, containing information identifying the direction of the transmission. In the case of the I-TXSS beacon 304, the Direction field 424 contains information indicating that the SSW frame 410 is sent by the AP 102 as the initiator. The SSW field 420 also includes a sector ID field 426 containing data (e.g., a sector identifier) identifying the sector in which the SSW frame 410 is sent. The SSW field 420 also contains a DMG antenna ID field 428 containing data (e.g., an antenna identifier) identifying the directional multi-gigabit (DMG) antenna used for sending the SSW frame 410. The SSW field 420 also contains additional fields, as shown in FIG. 4, which will not be described in detail here. The SSW Feedback field 422, when transmitted during ISS 302, includes information about the total number of sectors over which the ISS 302 is performed, and the number of receive DMG antenna for receiving the following RSS 306.

The format of the R-TXSS beacon 308, as defined in the IEEE 802.11ad standard, is similar to that of the I-TXSS beacon 304, with some differences. The direction of the transmission is identified in the Direction field 424 to indicate that the SSW frame 410 is sent by the STA 104 being the responder. The SSW Feedback field 422 provides information (e.g., a sector identifier) identifying the preferred transmission sector and also information (e.g., an antenna identifier) identifying the preferred DMG antenna to be used by the AP 102. The SNR calculated for the preferred transmission sector is also reported in the SSW Feedback field 422. The I-TXSS beacon 304 and the R-TXSS beacon 308 are used to train the initiator (e.g., AP 102) and the responder (e.g., STA 104).

Figure 5:
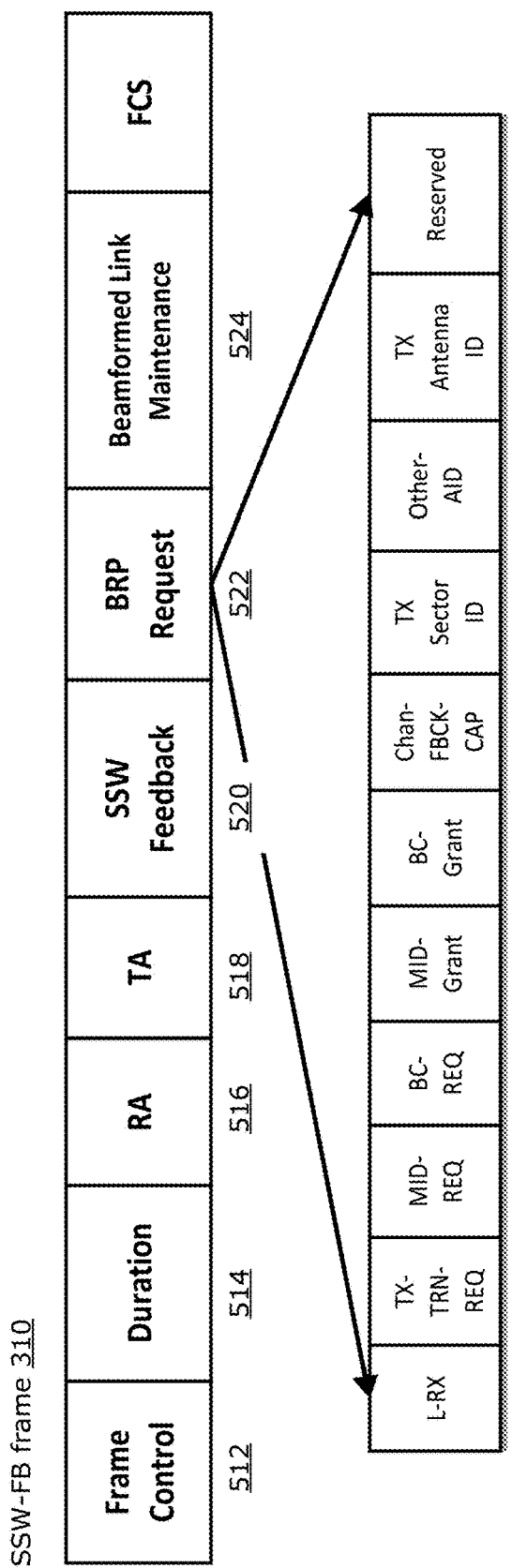
FIG. 5 is a block diagram illustrating an example sector sweep feedback frame.

FIG. 5 illustrates the format of a SSW-FB frame 310, as defined in the IEEE 802.11ad standard. As explained above, the SSW-FB frame 310 is transmitted by the AP 102 in order to associate each STA 104. The SSW-FB frame 310 includes a Frame Control field 512, a Duration field 514, a RA field 516, a TA field 518 and a SSW Feedback field 520, similar to that discussed above with respect to the SSW frame 410. The SSW-FB frame 310 further includes a BRP request field 522 and a Beamformed Link Maintenance field 524. The SSW-FB frame 310 also contains additional fields, as shown in FIG. 5, which will not be described in detail here. Details of the BRP request field 522 are shown in FIG. 5, and will not be described in detail here.

The BRP stage is optional, follows the SLS stage and takes place during the DTI 220 portion of the BI 200. During the BRP stage, an iterative procedure is used in order to refine the coarse beamforming performed during the SLS stage. In the BRP stage, both initiator and responder can request beamforming training for receive or transmit antenna patterns. The AWVs for the phased antenna arrays is predicted and adjusted during the BRP by using the iterative approach. This refinement may be carried out by evaluating a set of directional transmit or receive patterns against the preferred transmission sector determined earlier in the SLS stage. The additional beamforming training performed in the BRP stage may result in extra throughput and a more reliable communication link.

Figure 6:
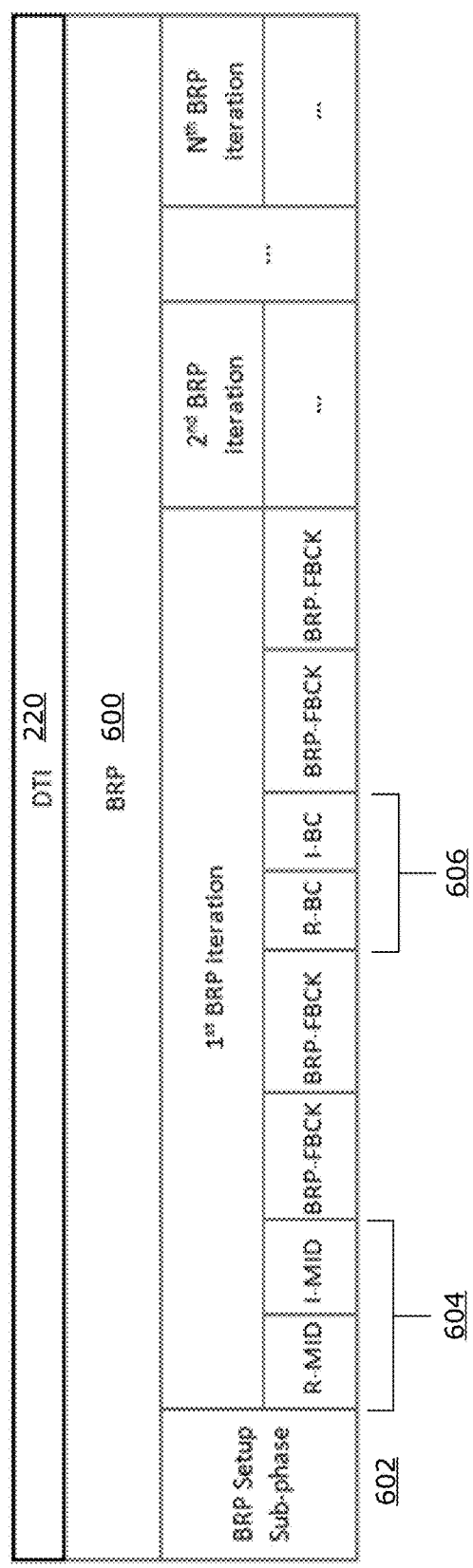
FIG. 6 is a block diagram illustrating different phases during an example beam refinement phase.

The BRP stage is now described with reference to FIG. 6. FIG. 6 is a block diagram showing details of the DTI 220 portion of the BI 200. There are several sub-phases in each iteration of the BRP stage 600. These sub-phases include the BRP setup sub-phase 602, multiple sector ID detection (MID) 604 (including responder MID (R-MID) and initiator MID (I-MID)), beam combining (BC) 606 (including responding BC (R-BC) and initiator BC (I-BC)), and beam refinement transactions (namely, the BRP iterations). The MID sub-phase 604 and the BC sub-phase 606 may be referred to together as the multiple sector ID detection and beam combining (MIDC) sub-phase.

Information is exchanged between the initiator and the responder during the BRP setup sub-phase 602 that is used to proceed to the next sub-phases. Better AWVs than the preferred AWV determined in the SLS stage may be resolved between the initiator and responder during the MIDC sub-phase, using BRP iterations. The beam refinement training that may be carried out during BRP 600 include transmit request beam refinement training and receive request beam refinement training. If both the initiator and responder at the SLS stage performed beamforming training only for the transmission side (e.g., using I-TXSS and R-TXSS, as discussed above), then during the BRP stage 600 the receive side may be trained (e.g., using receive sector sweep (RXSS)).

The beamforming protocol defined in the IEEE 802.11ad standard, as discussed above, refines the beam-widths of the STAs 104 in a sequential manner for each STA 104. In examples described herein, multi-beam refinement may be used to help reduce the time required for the beamforming operation. In multi-beam refinement, the AP 102 transmits multi-user transmission to multiple STAs 104 simultaneously, using MU-MIMO, during the BRP stage.

Implementing simultaneous communication links for mm-Wave by using a suitable scheme may help to improve network capacity. However, the throughput of simultaneous communication links can be affected by mutual interference generated from multi-user transmission. For example, even though the link rate for transmission from the AP 102 to a given STA 104 may be improved by beamforming, interference will be generated from this communication link to other STAs 104, causing a rate reduction to the communication links between the AP 102 and the other STAs 104. Thus, mutual interference is a challenge for multi-user simultaneous beamforming. This may be addressed by using digital beamforming pre-coding schemes, such as Zero Forcing (ZF). Such pre-coding schemes typically need the collection of the entire channel state information (CSI) matrix. Collecting complete CSI would introduce high calculation load and large overhead in mm-Wave communications. In examples discussed herein, a virtual grouping (VG) approach is used, which may enable multi-user simultaneous transmission with little or no overhead, compared to the conventional collection of CSI. Using VG, CSI may be collected only in certain situations, such as when there is more than one STA in a virtual sector group, or may not be needed, as discussed further below.

In accordance with the IEEE 802.11ad standard, the AP 102 has a plurality of pre-defined transmission sectors, each with its own sector identifier (ID), for directional communication with a STA 104. In examples described herein, a plurality of adjacent transmission sectors may be grouped together into a single virtual sector (VS). Further, a VG may be defined by a grouping of one or more VSs. Two or more VSs may be grouped together in a single VG where the VSs are mutually-orthogonal. In the present disclosure, the term "orthogonal" is used to refer to signals that do not interfere with each other. Thus, in mutually-orthogonal VSs, transmission to one VS does not interfere with simultaneous transmission to another VS. There may be a plurality of VGs defined by the AP 102. In some examples, the VGs defined by the AP 102 are non-overlapping (i.e., the VGs do not have any VSs in common), but in other examples two or more VGs may overlap (i.e., there may be at least one VS in common between at least two VGs). The VGs defined by the AP 102 may cumulatively cover all transmission sectors of the AP 102.

The AP 102 may select a plurality of STAs 104 for simultaneous transmission by identifying the STAs 104 having preferred AP transmission sectors belonging to a single VG, as explained further below. In this way, simultaneous transmission may then be carried out to multiple STAs 104 with little or no mutual interference.

In examples discussed below, simultaneous transmission from the AP 102 to multiple STAs 104 (using MU-MIMO spatial multiplexing) may be used to perform multi-user beam refinement during the BRP stage, which may help to improve beamforming efficiency and increase the throughput. The SLS stage is first carried out, similar to the IEEE 802.11ad standard as discussed above. From the SLS stage the AP 102 obtains sector information that may be used to select STAs 104 for simultaneous transmission (e.g., during the BRP stage).

Figure 7:
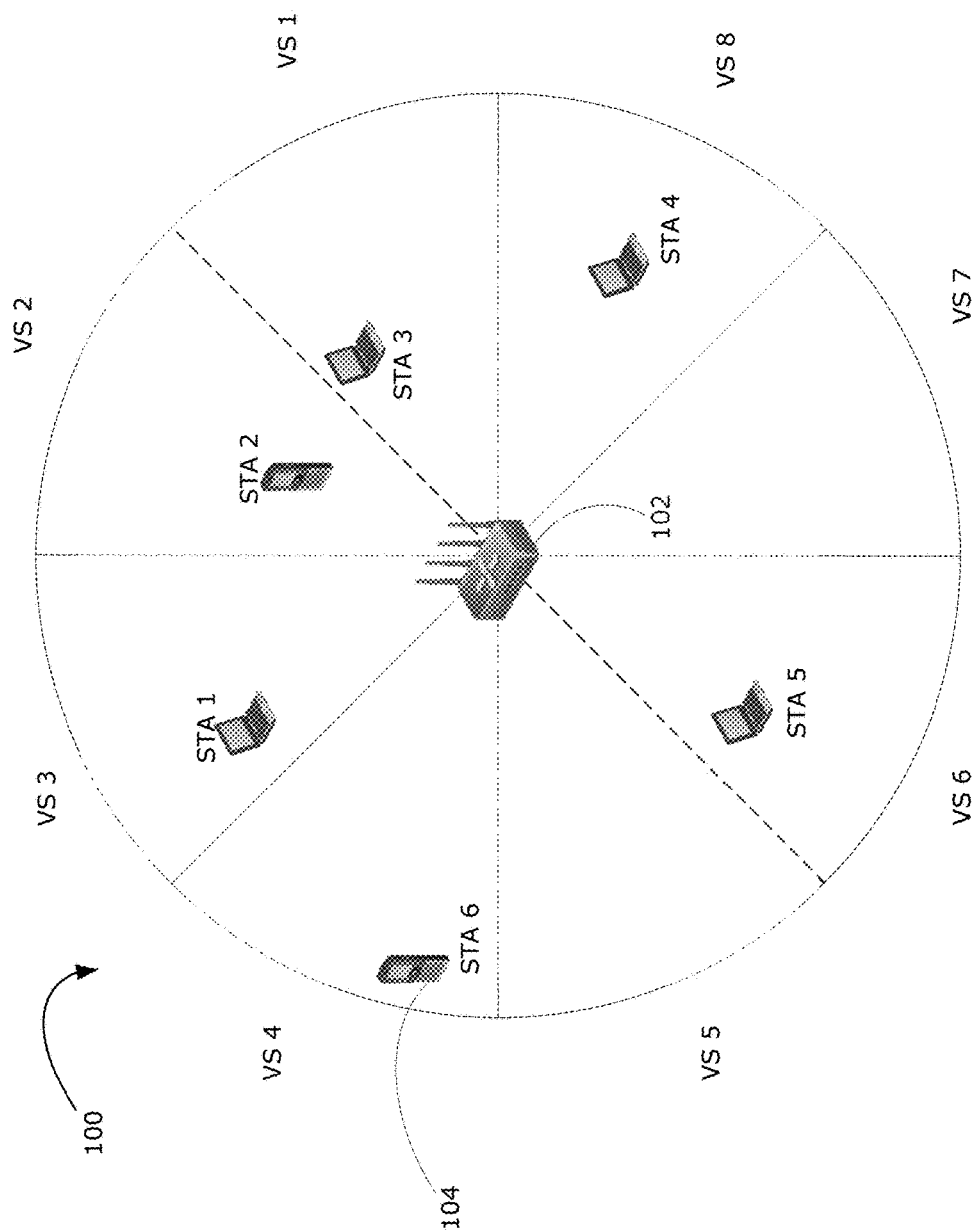
FIG. 7 is a schematic diagram illustrating another example system for multi-user transmission, including representation of virtual sectors.

In the example shown in FIG. 7, the system 100 is a single hop WLAN including one AP 102 and 6 STAs 104, individually labeled STA 1 to STA 6. Both the AP 102 and the STAs 104 have DMG antenna capabilities. The AP 102 has pre-defined transmission sectors, for example sector 1 to sector 512. The AP 102 has defined VSs, with each VS being a grouping of two or more transmission sectors. In the example shown, the sectors are grouped into eight VSs (represented by dotted lines), namely VS 1 to VS 8, each VS being a grouping of 64 transmission sectors. In some examples, there may be a greater or fewer number of VSs, there may be a greater or fewer number of transmission sectors per VS, and the VSs may be equal or unequal in number of grouped transmission sectors.

For example, where the transmission sectors are equally divided among the VSs, and where the VSs are equally divided between two VGs (denoted VG 1 and VG 2), the following equations may be used to dynamically define the VGs and VSs:

$$VG1 = \{S_{1j}\}; \left(\frac{V + 2mj - 2m}{V}\right) \leq S_{1j} \leq \left(\frac{2mj - m}{V}\right)$$

$$VG2 = \{S_{2j}\}; \left(\frac{V + 2mj - m}{V}\right) \leq S_{2j} \leq \left(\frac{2mj}{V}\right)$$

where $S_{1j}$ is the sector ID of transmission sectors defined for VG 1 and $S_{2j}$ is the sector ID of transmission sectors defined for VG 2; where m is the total number of defined transmission sectors (e.g., 512), V is the total number of VSs (e.g., 8), and j is $\{1 \leq j \leq V/2\}$. The number of VSs may be dynamically adjusted, for example.

In some examples, the AP 102 may define the VSs dynamically, for example depending on the density of the system 100 and/or to achieve a desired level of efficiency and/or overhead. For example, the AP 102 may dynamically define the VSs and/or VGs after receiving information from the sector sweeps. For example, a greater number of VSs may be defined, which may enable a greater number of STAs 104 to be selected for a simultaneous transmission; however, this may require a narrower transmission beam by the AP 102, which may result in higher overhead costs.

During the SLS stage, the AP 102 identifies (e.g., using information from the R-TXSS transmitted from each associated STA 104) the preferred transmission sector to use for transmission to each associated STA 104. For example, the maximum number of associated STAs 104 may be eight, however in other examples there may be a greater number of associated STAs 104. The AP 102 further identifies which VS each STA 104 belongs to. In FIG. 7, STA 1 is in VS 3; STA 2 is in VS 2; STA 3 is in VS 1; STA 4 is in VS 8; STA 5 is in VS 6; and STA 6 is in VS 4.

The AP 102 further defines VGs by grouping two or more VSs per VG, ensuring that transmission to a given VS in a VG is orthogonal to transmission to all other VSs of the same VG. For example, the VSs may be defined such that transmissions to non-adjacent VSs are orthogonal to each other. By non-adjacent, it is meant that there is a spacing of at least one other VS between two non-adjacent VSs. In some examples, a VG may be defined as only one VS. The AP 102 may have pre-defined a plurality of VGs, which may or may not overlap with each other, and which may cumulatively cover all transmission sectors of the AP 102. In the example of FIG. 7, the AP 102 may have defined VG 1 as the group of VS 1, VS 3, VS 5 and VS 7; and VG 2 as the group of VS 2, VS 4, VS 6 and VS 8. Thus, each VG may include four VSs, each VS being in a different quadrant about the AP 102. In some examples, the AP 102 may define the VGs dynamically, provided the orthogonality of VSs is preserved within each VG.

The AP 102 identifies which STAs 104 can be selected for a multi-user simultaneous transmission by identifying which STAs 104 have preferred AP transmission sectors belonging to the same VG. This identification may be carried out by identifying whether the preferred AP transmission sector for a given STA 104 belongs to a VS defined for a given VG.

For example, using the preferred AP transmission sector identified for each associated STA 104, the AP 102 may identify that STA 1 and STA 3 belong to VG 1, and that STA 2, STA 4, STA 5 and STA 6 belong to VG 2. The STAs 104 grouped in the same VG may then be selected by the AP 102 for simultaneous transmission within the same BI (e.g., simultaneous transmission of BRP frames during the BRP phase). That is, the AP 102 may transmit a multi-user simultaneous transmission to STA 1 and STA 3, and similarly may transmit a multi-user simultaneous transmission to STA 2, STA 4, STA 5 and STA 6. It should be noted that FIG. 7 illustrates a scenario in which there is only one STA 104 per VS. In other examples, there may be two or more STAs 104 per VS, and this will be addressed in examples discussed further below.

After the AP 102 has grouped the associated STAs 104 into respective one or more VGs, transmission to each VG may take place in separate BIs, or in the same BI.

Figure 8:
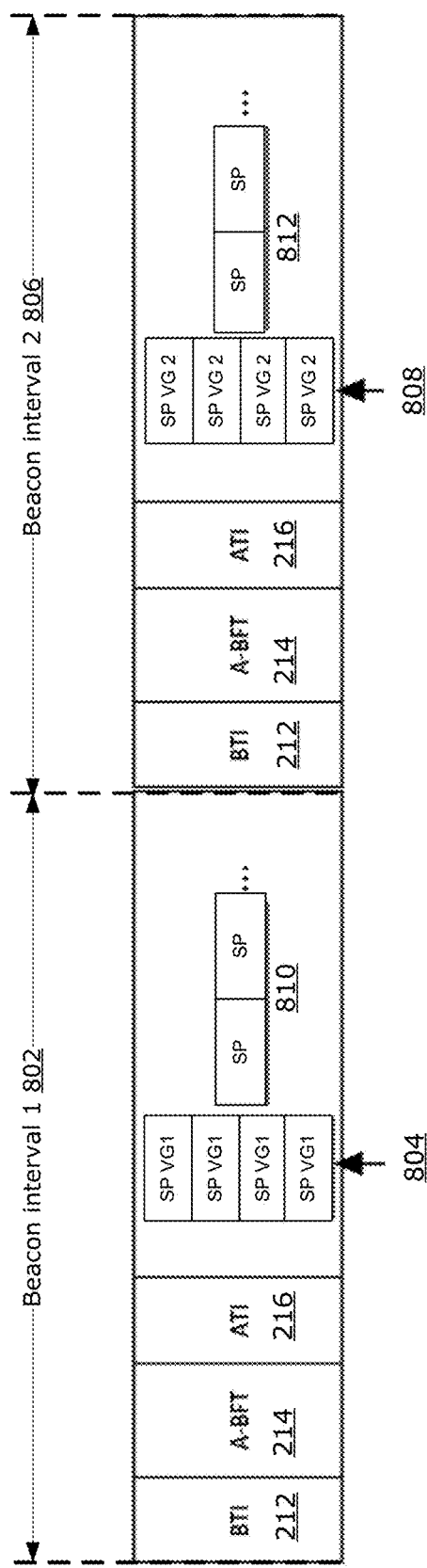
FIG. 8 is a block diagram illustrating an example of simultaneous transmissions taking place over multiple beacon intervals.

FIG. 8 shows an example in which the AP 102 of FIG. 7 transmits to different VGs during different BIs. In the first BI, BI 1 802, the AP 102 selects the STAs 104 grouped in VG 1 (namely, STA 1 and STA 3) for multi-user simultaneous transmission during a time slot 804 of the BRP phase, and the STAs 104 grouped in VG 2 are ignored. In the second BI, BI 2 806, the AP 102 selects the STAs 104 grouped in VG 2 (namely, STA 2, STA 4, STA 5 and STA 6) for multi-user simultaneous transmission during a time slot 808 of the BRP phase. In both BI 1 802 and BI 2 806, the multi-user simultaneous transmission may be followed by regular transmissions in SPs 810, 812, as usual. Although two VGs are discussed in this example, there may be a fewer or greater number of VGs. Using the approach exemplified in FIG. 8, the AP 102 may perform simultaneous transmission to the different VGs in different BIs.

Figure 9:
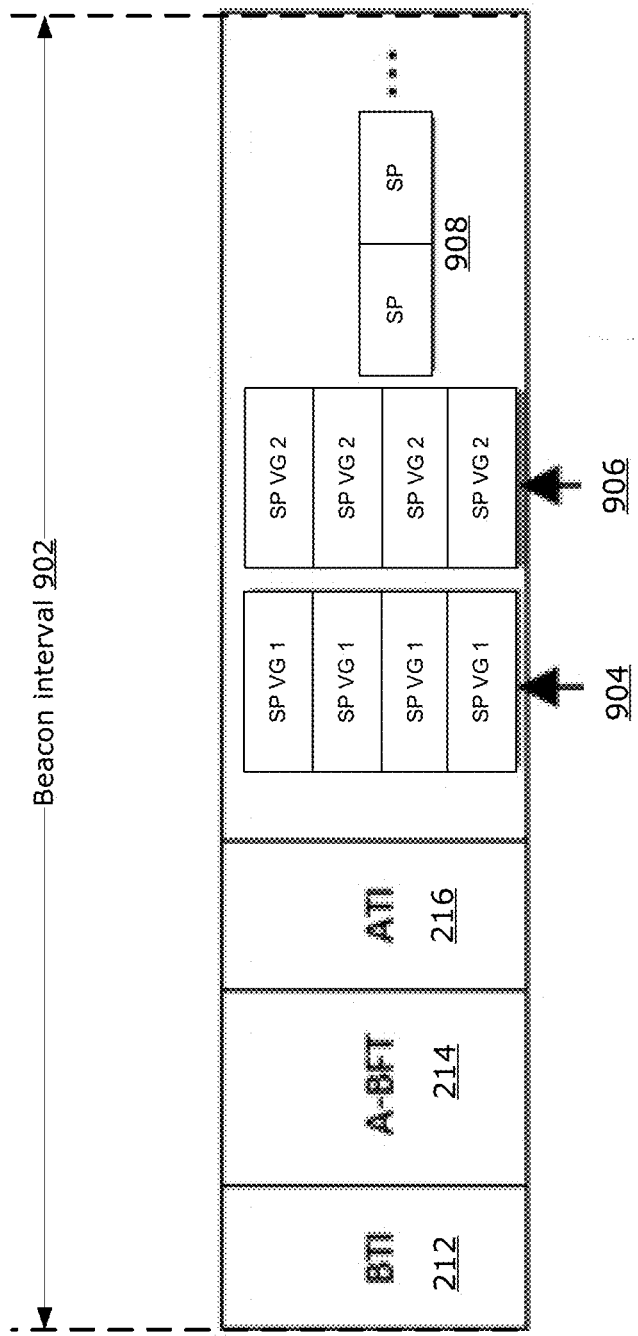
FIG. 9 is a block diagram illustrating an example of simultaneous transmissions taking place over a single beacon interval.

FIG. 9 shows an example in which the AP 102 of FIG. 7 transmits to different VGs during the same BI 902. The AP 102 selects the STAs 104 grouped in VG 1 for multi-user simultaneous transmission during one SP time slot 904 in the BRP phase, and selects the STAs 104 grouped in VG 2 for multi-user simultaneous transmission during another SP time slot 906 in the BRP phase. The multi-user simultaneous transmissions may be followed by regular transmissions in SPs 908, as usual. This approach may provide additional time savings compared to the approach shown in FIG. 8, by omitting a second SLS phase. Although two VGs are discussed in this example, there may be a fewer or greater number of VGs. Using the approach exemplified in FIG. 9, the AP 102 may perform simultaneous transmission to different VGs in different slots of the same BI.

In the examples discussed above, instead of using a digital pre-coding scheme to cancel multi-user interference, the use of VG uses the physical advantage of spatial multiplexing of the MU-MIMO to mitigate multi-user interference without the need to introduce additional complexity and overhead to the system.

In the example of FIG. 7 discussed above, it was assumed that there is no more than one associated STA 104 per VS. This may be the case, for example, where there are few STAs 104 in the coverage area of the AP 102, or where the VSs defined by the AP 102 are relatively narrow. In some cases, there may be more than one associated STA 104 per VS, for example in a densely populated network. To avoid mutual interference between STAs 104 belonging to the same VS, the AP 102 may select no more than one STA 104 per VS for a simultaneous transmission. The AP 102 may select one STA 104 from among multiple STAs 104 in a given VS based on a selection criterion, such as first-come-first served or based on the amount of path-loss for each STA 104 in the given VS. Alternatively, in some examples, the AP 102 may use a suitable digital pre-coding scheme to ensure orthogonality for simultaneous transmission to the STAs 104 within the same VS, for example using Zero-Forcing (ZF) to ensure orthogonality or to maximize the rate sum. Where a digital pre-coding scheme is used, the use of VSs may reduce the complexity of the digital pre-coding scheme, compared to the conventional approach, because the digital pre-coding scheme need only be used for a VS having multiple STAs 104 and not for the entire coverage area of the AP 102. The AP 102 does not need to use the digital pre-coding scheme for any VS having one or fewer STA 104.

Figure 10:
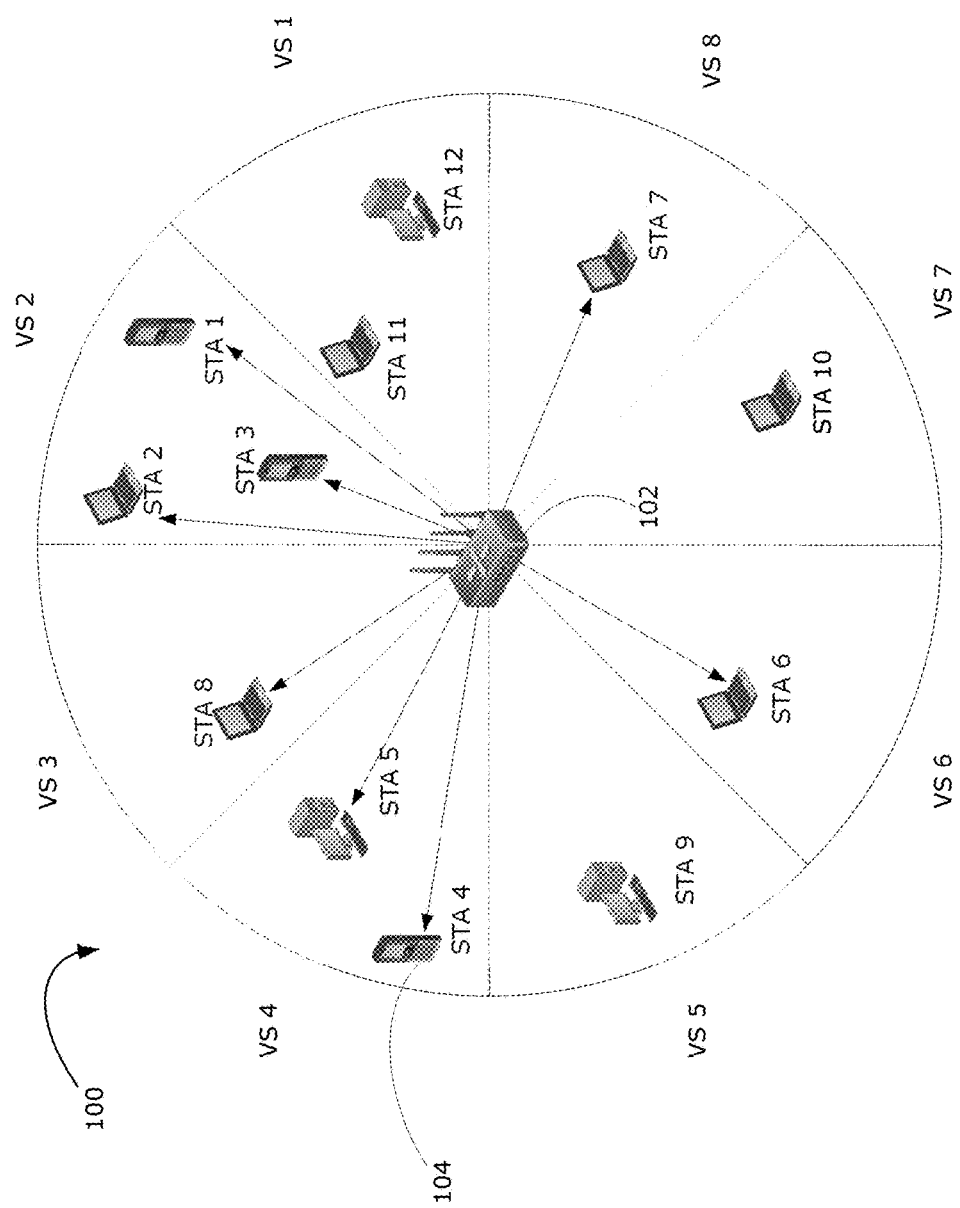
FIG. 10 is a schematic diagram illustrating another example system for multi-user transmission, including representation of virtual sectors.

FIG. 10 is a schematic diagram of an example system in which more than one STA 104 may be located in a single VS. In this example, there are 12 STAs 104 within coverage of the AP 102. Eight STAs 104 have successfully associated with the AP 102 (indicated by arrows). Without the use of VSs, digital pre-coding over the entire coverage area may be conventionally used to mitigate multi-user interference and select STAs 104 among all eight associated STAs 104 for simultaneous transmission. With the use of VSs, this may be simplified.

Similarly to FIG. 7, the AP 102 in FIG. 10 may have defined eight VSs. Having determined which VS each associated STA 104 belongs to (e.g., using the preferred transmission sector identified during the A-BFT period), the AP 102 identifies any VSs containing more than one associated STA 104. In this case, VS 2 and VS 4 each contain two or more associated STAs 104.

The AP 102 may obtain CSI information for the associated STAs 104 of a VS containing more than one associated STA 104, and may use a digital pre-coding scheme (e.g., zero-forcing) to ensure orthogonality for simultaneous transmission to the associated STAs 104 of that VS. This may reduce the amount of overhead by reducing the number of STAs 104 for which digital pre-coding is required.

Alternatively, digital pre-coding need not be used. Instead, the AP 102 may use a criterion (e.g., least amount of path-loss) to select STA 3 from VS 2 for simultaneous transmission to VG 2. The remaining unselected STA(s) 104 may be selected for a later simultaneous transmission, or the AP 102 may communicate with the remaining STA(s) 104 using single-user transmission in sequential SPs according to the scheduling scheme defined in the IEEE 802.11ad standard. This may enable the AP 102 to schedule simultaneous transmissions without any need to collect CSI and perform digital pre-coding, thus reducing the amount of overhead required.

As in the example of FIG. 7, the AP 102 defines VG 1 as the group of VS 1, VS 3, VS 5 and VS 7; and VG 2 as the group of VS 2, VS 4, VS 6 and VS 8. In the example of FIG. 10, this means that the AP 102 may select STA 8 (belonging to VS 3) for simultaneous transmission to VG 1. For VS 2 and VS 4, the AP 102 may use a selection criterion (e.g., first-come-first served or amount of path-loss) to select one associated STA 104 per VS. For example, the AP 102 may select STA 3 for VS 2 and STA 5 for VS 4. The simultaneous transmission to VG 2 may then include multi-user simultaneous transmission to STA 3, STA 5, STA 6 and STA 7. The remaining STA 1, STA 2 and STA 4 may be selected for later simultaneous transmission (e.g., STA 2 and STA 4 may be selected for a further simultaneous transmission) or the AP 102 may not use simultaneous transmission for communication with these STAs 104.

Figure 11A:
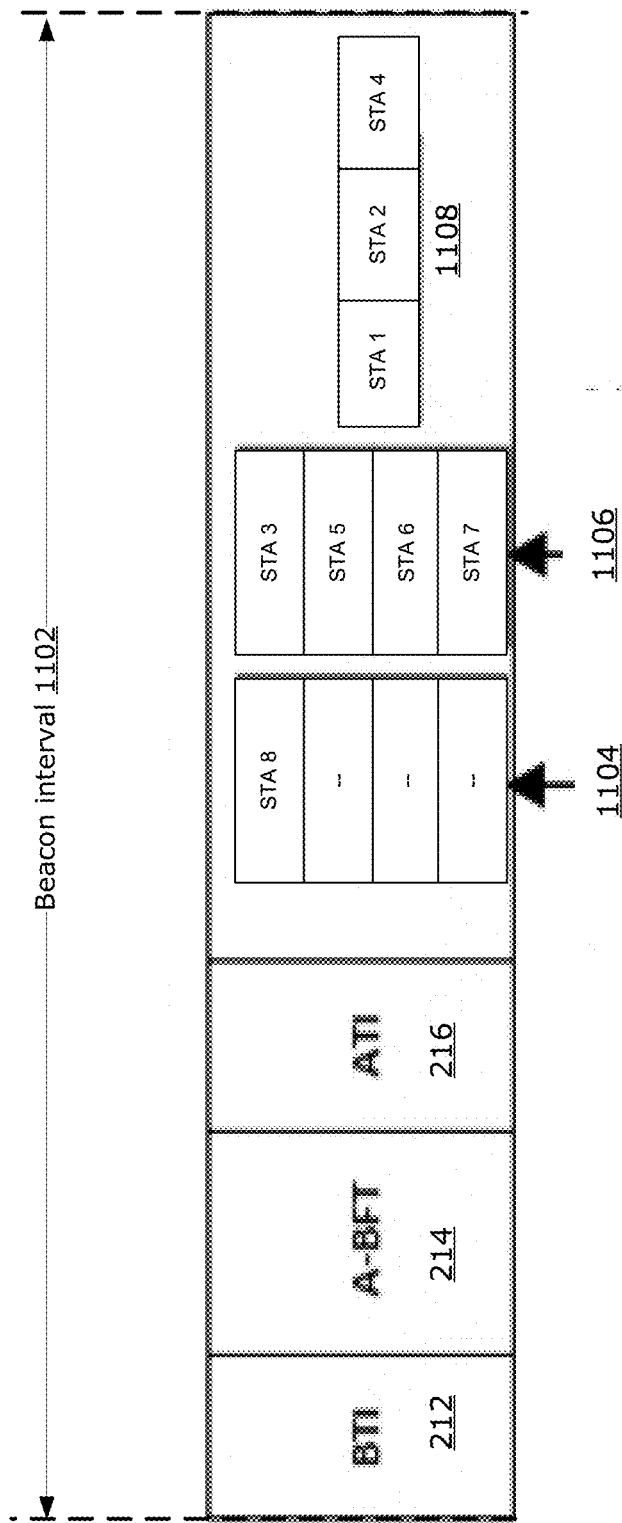
FIGS. 11A and 11B are a block diagram illustrating examples of simultaneous transmissions that may be implemented in the system of FIG. 10.

FIG. 11A is a block diagram illustrating an example BI 1102 for beamforming in the example system of FIG. 10. In this example, the AP 102 performs multiple simultaneous transmissions in the same BI. As shown in FIG. 11A, the BRP stage may include a multi-user simultaneous transmission from the AP 102 to the selected STAs 104 of VG 1 (namely, STA 8) during a first time slot 1104. The AP 102 may then simultaneously transmit to the selected STAs 104 of VG 2 (namely STA 3, STA 5, STA 6 and STA 7) during a second time slot 1106. Transmission to the remaining STAs (namely STA 1, STA 2 and STA 4) may take place in single-user transmissions in subsequent time slots 1108. In this example, five time slots are used for the BRP rather than eight, as would be the case using conventional beamforming in accordance with the IEEE 802.11ad standard.

Figure 11B:
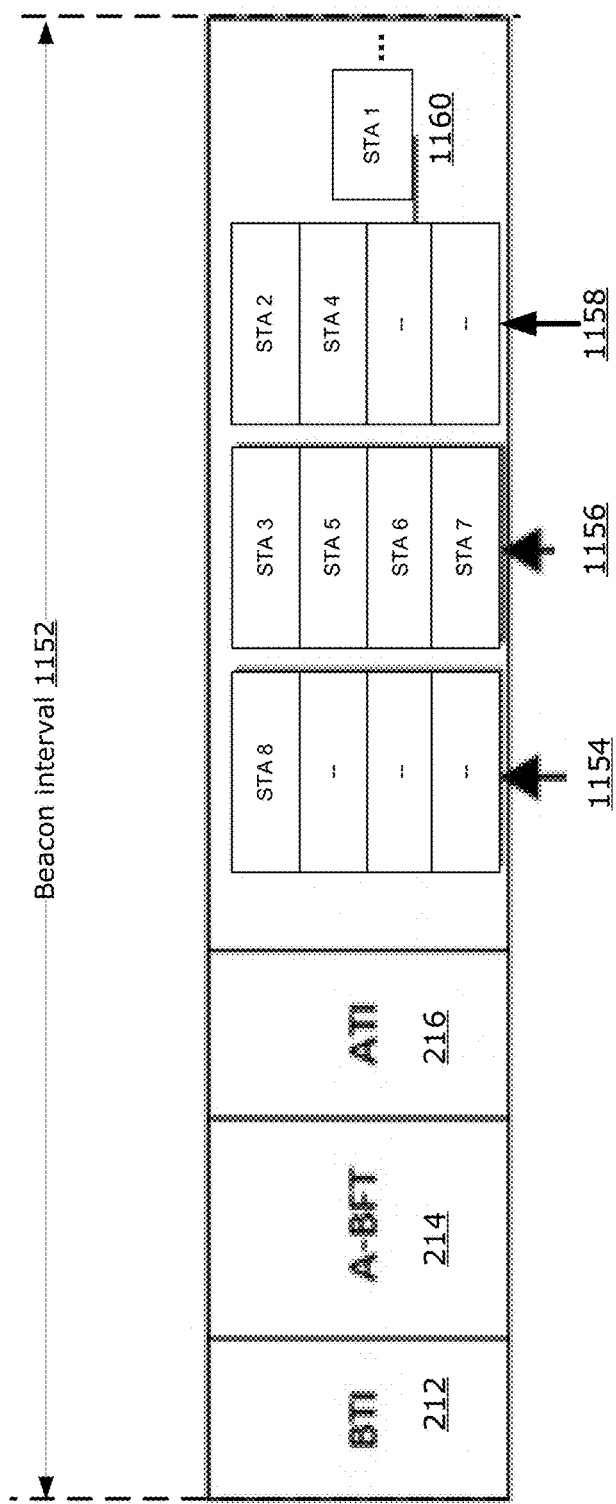

FIG. 11B is a block diagram illustrating another example BI 1152 for beamforming training in the example system of FIG. 10. In this example, the AP 102 performs multiple simultaneous transmissions in the same BI. As shown in FIG. 11B, the BRP stage may include a multi-user simultaneous transmission from the AP 102 to the STAs of VG 1 during a first time slot 1154, and to the selected STAs of VG 2 during a second time slot 1156, similar to FIG. 11A. The AP 102 may further perform a multi-user simultaneous transmission to STA 2 and STA 4 during a third time slot 1158. Finally, the AP 102 may transmit to STA 1 in a single-user transmission during a fourth time slot 1160. In this example, four time slots are used for the BRP, thus providing even greater time savings compared to conventional beamforming.

Figure 12:
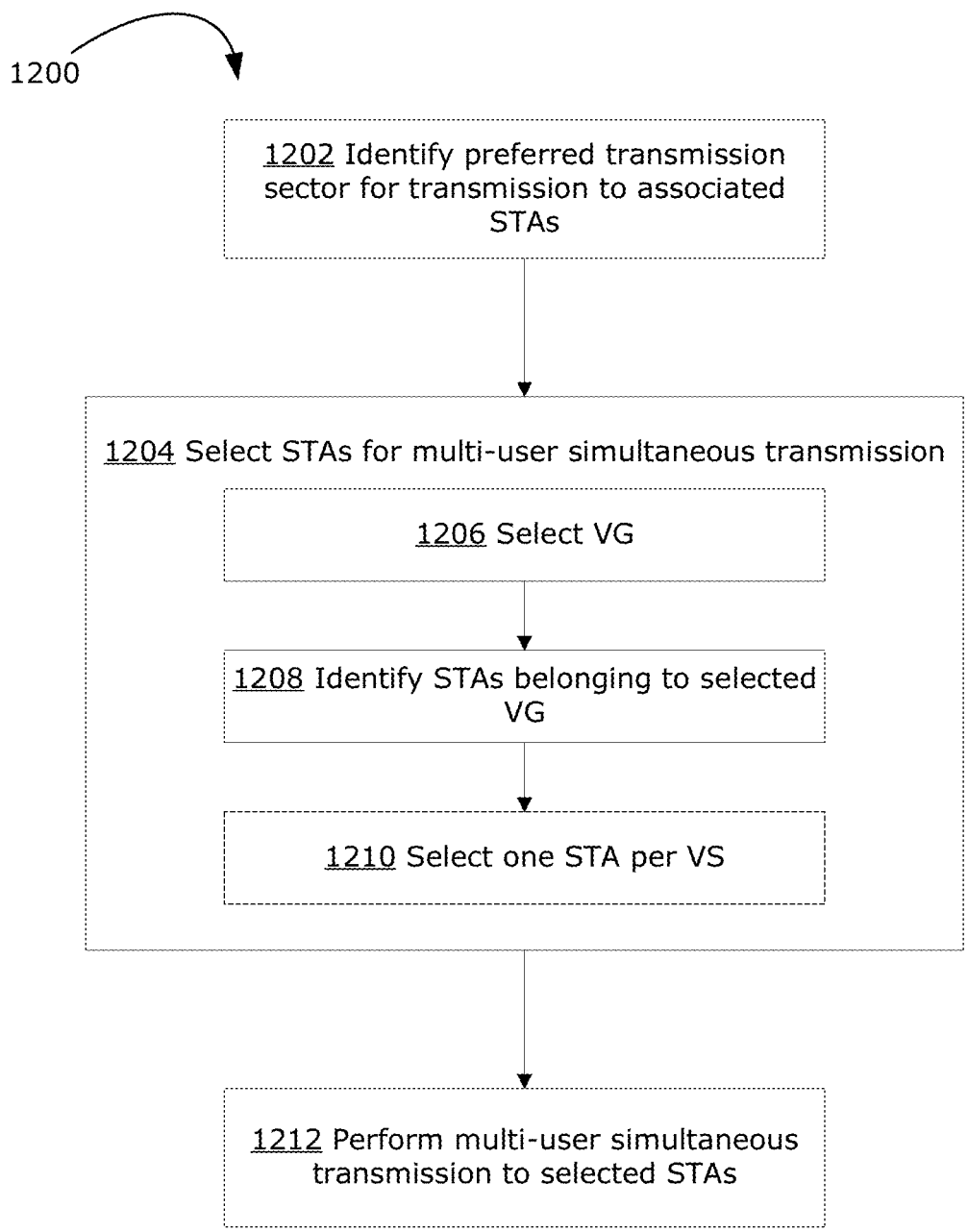
FIG. 12 is a flowchart illustrating an example method for performing simultaneous transmission to multiple stations.

FIG. 12 is a flowchart illustrating an example method 1200 for MU-MIMO that may be carried out by the AP 102. Although described with reference to an AP 102 and STAs 104, for the purpose of beamforming, the example method may be implemented by any transmitter for simultaneous transmission to two or more receivers, for any suitable purpose.

At 1202, the AP 102 identifies the preferred AP transmission sector for each associated STA 104. This may be performed during the sector sweeps as described above. For example, the AP 102 may receive information from each STA 104, during association, identifying (e.g., in the form of a sector ID) the preferred transmission sector for transmission from the AP 102 to each respective associated STA 104.

In some examples, the AP 102 may further identify which VS each associated STA belongs to. This may be performed by the AP 102 identifying whether the preferred AP transmission sector for a given STA falls within the group of transmission sectors grouped in a given VS. In some examples, the AP 102 may instead sort the STAs into different VSs as part of 1204, discussed below.

At 1204, the AP 102 selects a plurality of STAs 104 for multi-user simultaneous transmission (e.g., for BRP transmission). The selection of STAs 104 for simultaneous transmission may involve 1206, 1208 and 1210 as described below, for example.

At 1206, the AP 102 selects one VG for the simultaneous transmission. This may involve the AP 102 identifying the VSs belonging to the selected VG. For example, the AP 102 may have pre-defined a plurality of VGs, with each VG being defined by a plurality of VSs, and each VS being defined by a plurality of transmission sectors. The AP 102 may have definitions of the VGs and VSs stored in memory (e.g., in a look-up table), for example. In some examples, the AP 102 may select the VG according to a pre-defined order (e.g., select VG 1 first, then VG 2, and so on), or some other selection criterion (e.g., select VG having greater number of VSs first).

At 1208, the AP 102 identifies which of the associated STAs 104 belong to the selected VG. For example, the AP 102 may identify which VS a given STA 104 is in, if not already done at 1202. The AP 102 may identify the given STA 104 as belonging to the selected VG if the VS to which the STA 104 belongs is part of the selected VG. Those STAs 104 belonging to the selected VG may then be selected for simultaneous transmission.

Optionally, at 1210, if there is any VS containing more than one associated STA 104, the AP 102 may select one STA 104 from that VS for simultaneous transmission. This selection may be performed according to a selection criterion, such as first-come-first served (e.g., the first STA 104 to be associated in the VS is selected) or amount of path-loss (e.g., the STA 104 with least amount of path-loss is selected). 1210 may not be performed in examples where the AP 102 instead uses digital pre-coding to preserve orthogonality for the STAs 104 of that VS.

Although described in a particular order above, 1206, 1208 and 1210 may be performed in any suitable order. For example, if the STAs 104 were sorted into VSs prior to 1204, the AP 102 may select one STA 104 per VS (at 1210) prior to selecting a VG (at 1206).

If there are any associated STAs 104 that have yet to be scheduled for a transmission, the AP 102 may schedule simultaneous transmission, for example by returning to 1206 to select another VG. In examples where the AP 102 has a plurality of pre-defined VGs, the AP 102 may perform 1204 for each different VG until all pre-defined VGs have been considered. In some examples, the AP 102 may re-select a previously selected VG, such as where there is a STA 104 that was not selected at 1210. In some examples, not all pre-defined VGs may be considered. For example, where all associated STAs 104 have been scheduled for transmissions before all pre-defined VGs have been considered, not all pre-defined VGs may be considered.

In some examples, if there are any STAs 104 not selected at 1210, the AP 102 may schedule single-user transmissions to the remaining STAs 104. The single-user transmissions may take place in time slots following the multi-user transmission, for example.

Generally, the AP 102 may schedule all the necessary SP transmissions first before performing BRP.

At 1212, the AP 102 performs multi-user simultaneous transmission to the selected STAs 104. For example, this may be for performing multi-beam refinement simultaneously for the selected STAs. Generally, the maximum number of STAs 104 that are the recipients for the multi-user transmission may be governed by the number of VSs in the selected VG, because only one STA 104 may be selected per VS. By selecting a VG defined as having a greater number of narrower VSs, more STAs 104 may be selected for multi-user transmission, at the cost of requiring a narrower beam.

Where the AP 102 performs multiple multi-user transmissions, each multi-user transmission may be performed in a different BI (e.g., as illustrated in the example of FIG. 8), or may be performed in different time slots of the same BI (e.g., as illustrated in the example of FIG. 9).

FIG. 15 shows an example algorithm for selecting STAs 104 for multi-user simultaneous transmissions, where each multi-user transmission is performed in a different BI. FIG. 16 shows an example algorithm for selecting STAs 104 for simultaneous transmissions, where each multi-user transmission is performed in different time slots of the same BI.

As discussed above, where there is more than one STA 104 in a VS, the AP 102 may select one STA 104 per VS for simultaneous transmission. In an example, the path-loss model described in the IEEE 802.11ad standard for conference room environment may be used for performance evaluation, as a selection criterion for selecting one STA 104 from among two or more STAs 104 in a single VS.

The path-loss model is given in the IEEE 802.11ad standard as:

$$PL[dB]=A+20 \log_{10}(f)+10\gamma \log_{10}(d)$$

where A=45.5 and γ is the path-loss exponent and equal to 1.4, where both A and γ are set for a Non-line-of-sight (NLOS) environment. f=60 GHz, which is the central frequency, and d is the transmission distance.

Based on this path-loss model, when the AP 102 determines that more than one associated STA 104 belongs to the same VS, the AP 102 selects, for simultaneous transmission, the STA 104 with the lowest path-loss among the STAs 104 belonging to the same VS. The remaining unselected STA(s) 104 may be scheduled for later transmission as described above.

Details of how to perform simultaneous multi-beam refinement with multiple STAs 104 is discussed below. Generally, the process described below may be similar to the BRP stage defined in the IEEE 802.11ad standard, but with multi-user simultaneous transmission of the frames. In the BRP stage, multi-beam refinement can be achieved for several STAs 104, based on the scheduling performed during the SLS stage, as discussed above. Using MU-MIMO with spatial multiplexing, BRP may be carried out with multiple STAs 104 simultaneously, thus reducing the BF operation time. This may be similar to that defined in the IEEE 802.11ad standard, except that beam refinement is performed for multiple STAs 104 at the same time.

During the selection of STAs 104 for simultaneous transmission, the AP 102 may set the MID-REQ or BC-REQ fields BRP Request field 522 of the SSW-FW frame 310 to the value 1, in order to use the BRP setup sub-phase in the BRP stage. The intent and capabilities of the associated STAs 104 to carry out the BRP stage are communicated to the AP 102 via BRP frames in the BRP setup sub-phase. Further, beam refinement transactions and the MIDC sub-phase can be established in the BRP setup sub-phase. During the BRP setup sub-phase (which may take place during the ATI and part of the DTI), the AP 102 transmits a BRP packet to all STAs 104 that were selected for simultaneous transmission, with the Capability Request subfield set to the value 1 and a request for the MID sub-phase and BC sub-phase, if appropriate, within the BRP Request field. Then, the selected STAs 104 reply with BRP packets that contain MID sub-phase and BC sub-phase, if appropriate. When both the STAs 104 and the AP 102 transmit to each other a BRP packet with the Capability Request subfield set to the value 0, the BRP setup sub-phase will be terminated and this BRP packet may be the first BRP packet of a MID or BC sub-phase.

The MID and BC sub-phase may then be performed for the selected STAs 104 simultaneously, for example if requested in the preceding sub-phases. The BRP Request field 522 in the SSW-FB frame 310, or the BRP frame, includes both MID-REQ and BC-REQ subfields. Both MID and BC sub-phases are called MIDC sub-phase. Better AWVs than the best AWV that found in the SLS stage is resolved between STAs by using the MIDC sub-phase. If all the PCP/AP and the selected STAs at the SLS stage used only the transmit sector sweep (TXSS), then here in this stage the receive side will be refined (using receive sector sweep RXSS). After that, a reply from the responder STA with the best receive quality is reported. For this process, the request-response frame of the BRP continues until the responder sets the capability-request field to 0, where both STAs have no request for training. The second stage of BF training will be completed when all the PCP/AP and the selected STAs have no request for beamforming training.

According to the IEEE 802.11ad standard, a spatial sharing (SPSH) mechanism is used to allow SPs belonging to different STAs in the same spatial vicinity to be scheduled concurrently over the same channel with interference mitigation. Therefore, employing spatial multiplexing for MIMO, the SPSH mechanism can be used for the multi-user transmission simultaneously by allocating several SPs simultaneously. It should be noted that STAs should first perform beamforming training associated with the AP before engaging the SPSH mechanism.

The overlapped SPs for downlink MU-MIMO transmission from the AP to those STAs selected for simultaneous transmission may be, for example, realized during polling periods (PPs) and grant periods (GPs) in the ATI, as defined in the IEEE 802.11ad standard. The selected STAs may be polled in the ATI, and STAs that have data to transmit may respond with service period request (SPR) frames. Then, during the grant period, which may immediately follow the polling period, overlapped SPs are scheduled. Downlink MU-MIMO data transmission to the selected STAs may be then achieved simultaneously using the SPSH approach.

According to the IEEE 802.11ad standard, there are two types of SP: namely existing SP and candidate SP. The AP requests the STAs to perform and report spectrum and radio resource measurements. The STAs first perform beamforming training with each other before engaging this procedure. By transmitting and receiving the Directional Channel Quality Request/Report between AP and STAs, the existing and candidate SPs can be scheduled in time overlapping mode (Multi-User mode). The AP may stop the spatial sharing if the link quality has dropped below acceptable levels, based on Directional Channel Quality Reports The following is a discussion of example simulation results, which help to illustrate the performance of an example of the VG technique described herein. It should be understood that these simulation results are for the purpose of illustration only and are not intended to be limiting.

In the example simulation results, examples of the VG approach, as disclosed herein, are compared to conventional beamforming as defined in the IEEE 802.11ad standard. In the simulations, it is assumed that the AP can randomly associate with up to eight STAs. According to the IEEE 802.11ad standard, the throughput of the IEEE 802.11ad system is up to 6.75 Gbps, using 64-QAM modulation and approximately 2 GHz of spectrum at 60 GHz over a short range of communication. For comparison purposes, the simulations assume the throughput for each time slot of the SP to be 6.75 Gbits. Thus, the throughput is 6.75 Gb per time-slot of the SP.

Figure 13A:
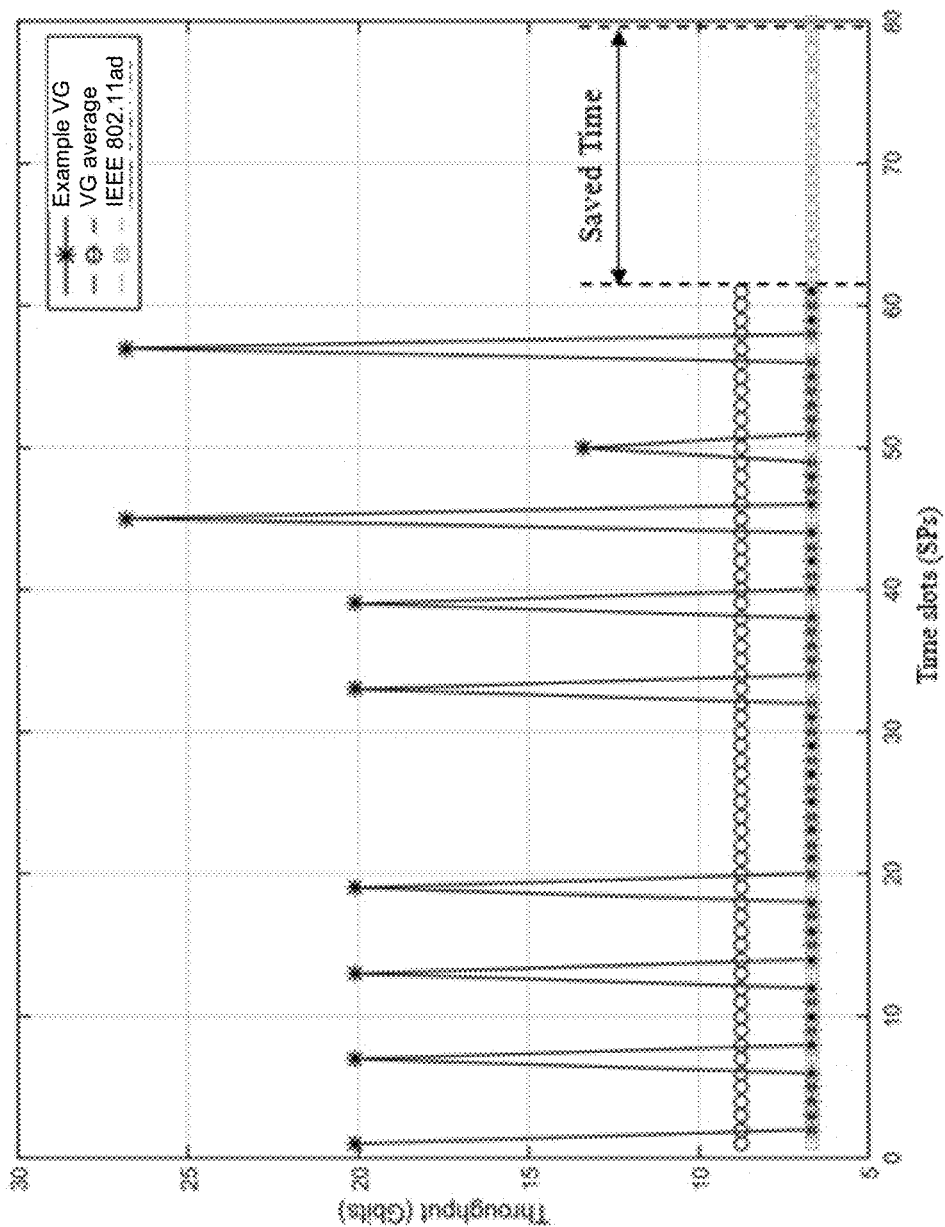
FIGS. 13A-14C are charts showing simulation results comparing example implementations described herein to conventional approaches.
Figure 13B:
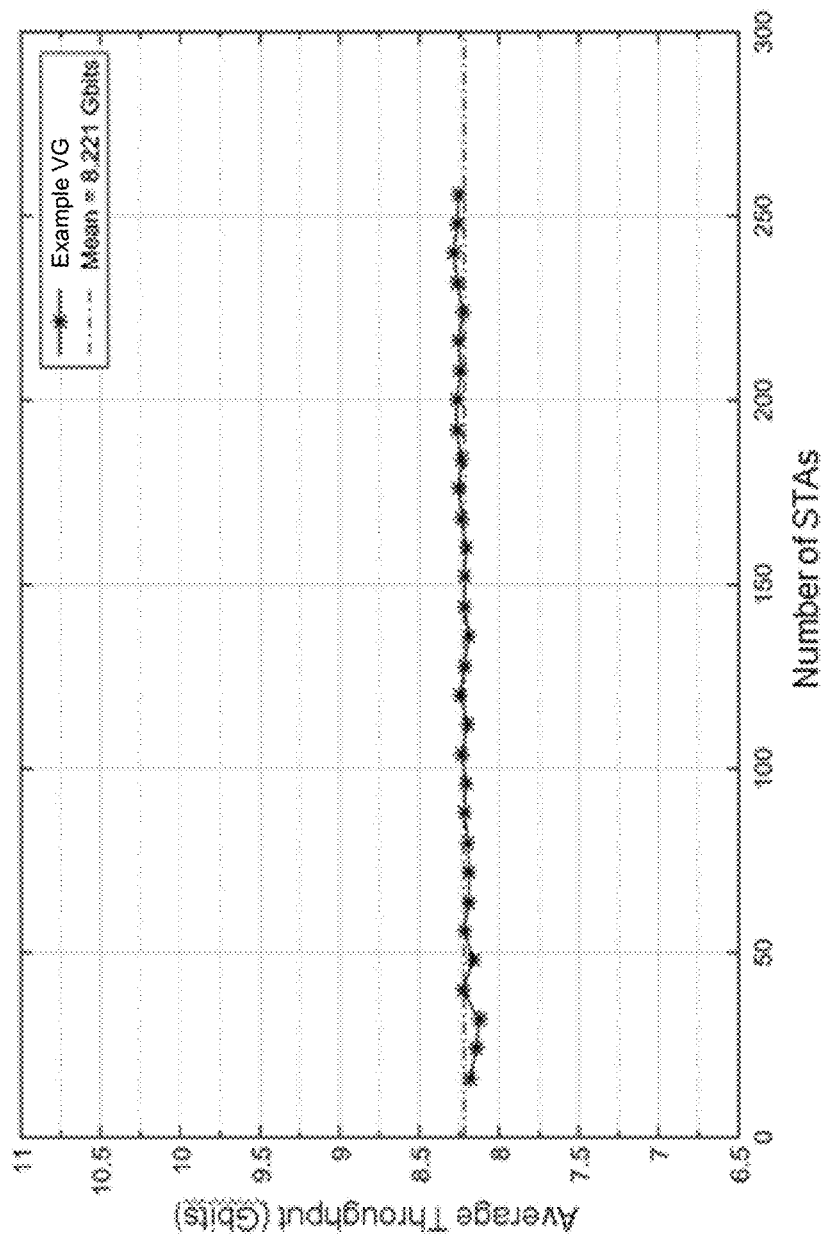
Figure 13C:
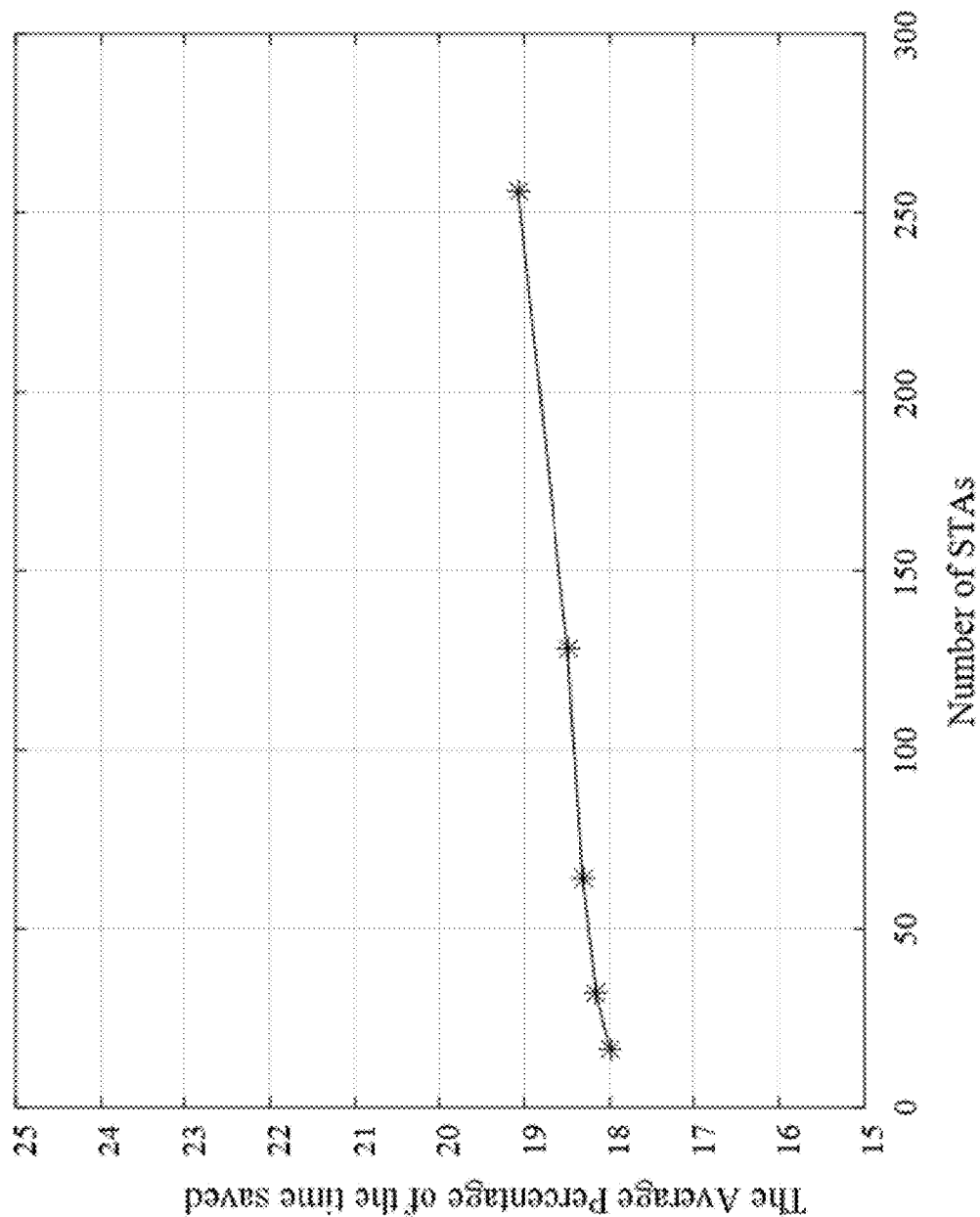

FIGS. 13A-13C are charts showing example simulation results in an example implementation in which the AP simultaneously transmits to different VG groups in different BIs (e.g., as described above with reference to FIG. 8). In these simulations, 8 VSs are predefined by the AP, with four VS grouped in each of two VGs (e.g., as described above with reference to FIG. 7).

In one simulation, there are 10 total BIs and 16 STAs within coverage of the AP. As shown in FIG. 13A, the throughput using the conventional method defined in the IEEE 802.11ad standard was found to be 6.75 Gbits for each time-slot, because the SPs are allocated sequentially and the throughput is the same for each SP. In comparison, the average throughput of the example VG approach was found to be increased to 8.79 Gbits, because for each BI there is a chance for a simultaneous transmission for a maximum of 4 slots using the example VG approach. Therefore, the number of time-slots can be saved depending on the direction of each STA and on the randomness of the 8 STAs that contend for association at the A-BFT period. In the simulation results shown in FIG. 13A, the total time-slot number that was used for the VG is 61 (for the total 10 BI) while 80 time-slots were used for the IEEE 802.11ad approach, because 8 time-slots are scheduled for every BI sequentially. Thus, the example VG approach was found to enable time saving of 19 time-slots and in the same time the throughput was found to be increased from 6.75 to 8.79 Gbits per time-slot.

In order to simulate an average throughput of the example VG approach and to show the effect of the number of STAs, another simulation was carried out with 100 different randomly distributed STAs and 100 BI for each specific number of STAs in the area. FIG. 13B shows the simulated average throughput per time-slot for different numbers of STA. The average throughput for the example VG approach was found to be around 8.2 Gbits even as the number of STAs increases. These results indicate that the number of STAs does not affect the performance of the example VG approach, because the scheduling of the simultaneous STAs depends on the transmission direction to the 8 random STAs that associate at the A-BFT in each BI. From these results, it was found that the average throughput of this example VG approach, in which one BI includes simultaneous transmission to only one VG, is approximately 8.2 Gbits. In addition to the throughput gained from this example VG approach, time savings may be achieved that can help improve the performance and reduce the overhead.

FIG. 13C show simulation results illustrating the average percentage of time saved when the example VG approach is used for different number of STAs, particularly for a densely populated network. The simulation results indicate that there is a slight improvement (1% from 16 to 256 STAs) in the saved time of the scheduled SPs by using the example VG approach. Notably, no negative effect was found in the performance when the number of STAs is increased.

Figure 14A:
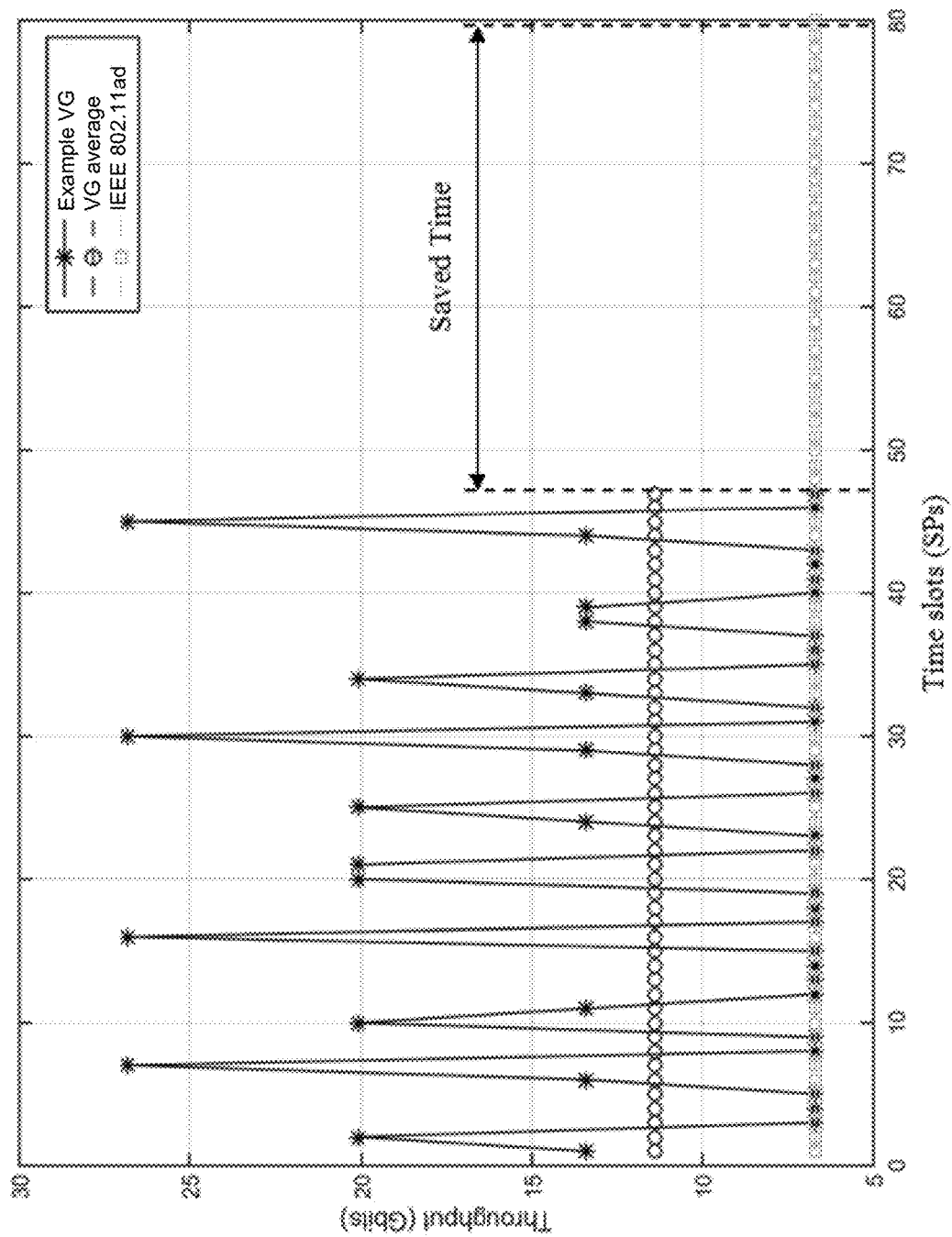
Figure 14B:
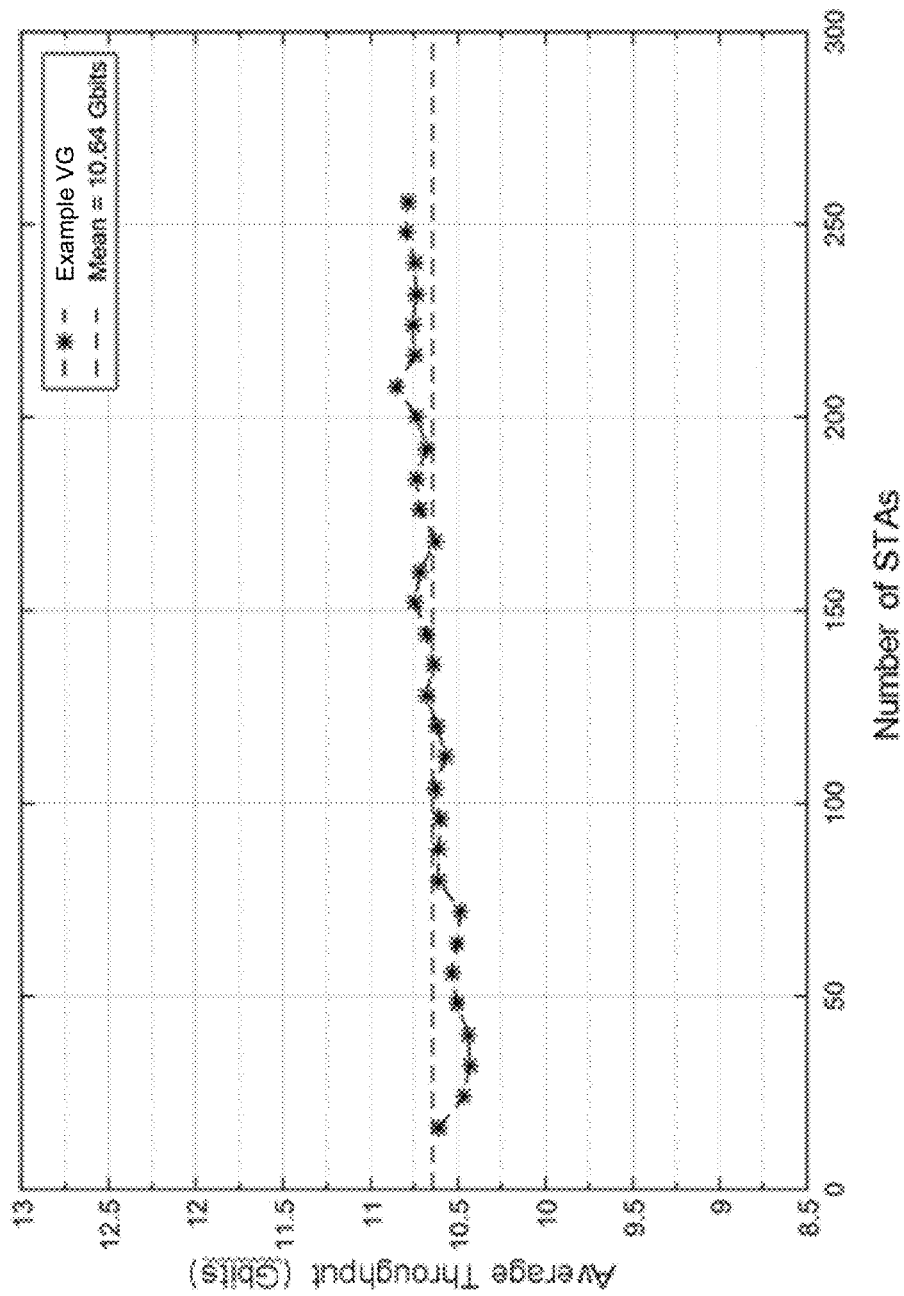
Figure 14C:
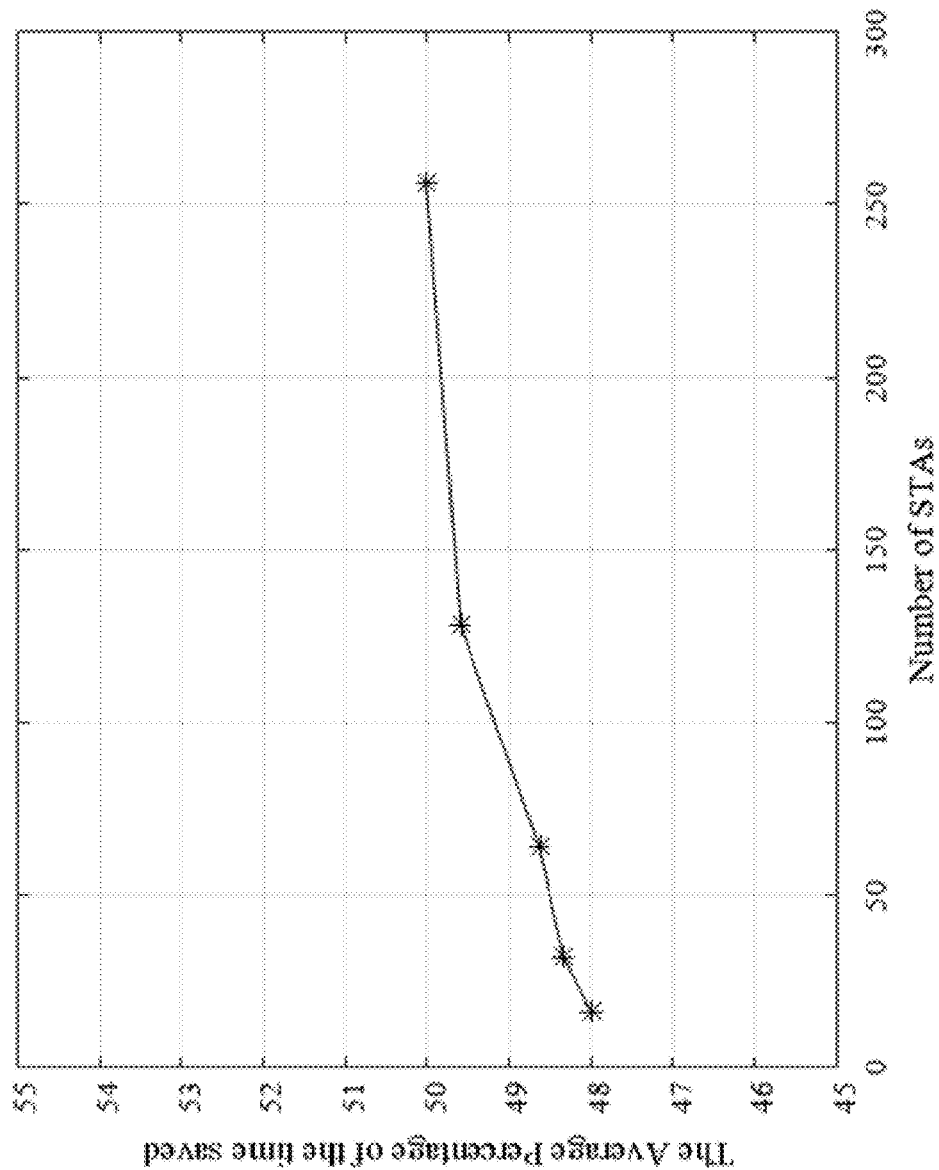

FIGS. 14A-14C are charts showing example simulation results in an example implementation in which the AP simultaneously transmits to two different VG groups in the same BI (e.g., as described above with reference to FIG. 9). In these simulations, 8 VSs are predefined by the AP, with four VS grouped in each of two VGs (e.g., as described above with reference to FIG. 7).

FIG. 14A show simulation results comparing the example VG approach with the conventional IEEE 802.11ad approach, when 10 total BI are used, and 16 STAs for the coverage area are considered. As shown in FIG. 14A, the average throughput of the example VG approach was found to be increased from 8.79 to 11.4 Gbits, when simultaneous transmissions to two VG groups take place in the same BI. The throughput increase may be expected because the opportunity for simultaneous transmission is increased over two time-slots and therefore the performance of throughout and saved time is improved. Comparing these simulation results with those of FIG. 13A above (in which simultaneous transmission to only one VG takes place in one BI), the total number of time-slots used is decreased from 61 to 47. Compared to the conventional IEEE 802.11ad approach, it was found that 33 time-slots are saved.

In another simulation, 100 different randomly distributed STAs and 200 BI for each specific number of STAs in the coverage area were simulated, in order to simulate an average throughput using the example VG approach and to show the effect of an increasing number of STAs. The simulated average throughput per time-slot for different number of STA, using simultaneous transmission to two VGs per BI, is shown in FIG. 14B. Although the number of STAs is changing and increasing, the average throughput for was found to be averagely stable around 10.64 Gbits because of the scheduling mechanism and the randomness of the 8 associated STAs at the A-BFT period. Again, the number of STAs was found to not affect the performance of the example VG approach. The average throughput was found to be approximately 10.64 Gbits. In addition to the throughput gained, the approach of transmitting to two VGs in the same BI was found to provide even greater time savings than the approach of transmitting to only one VG per BI.

In another simulation, 100 different randomly distributed STAs and 100 BI were simulated in order to simulate the time savings provided by the example VG approach where transmissions to two VGs take place in one BI, compared to the conventional IEEE 802.11ad approach, particularly for a densely populated network. The simulation results indicate that there is a slight improvement (2% from 16 to 256 STAs) in the saved time of the scheduled SPs by using the example VG approach. Notably, no negative effect was found in the performance when the number of STAs is increased.

The above example simulation results demonstrate that the example VG approaches disclosed herein (e.g., transmission to one VG per BI, as well as transmission to two VGs per BI) may help to improve the throughput of the system and may also decrease the number of time-slots used for the downlink SP transmission. The simulated throughput was found to be increased on average to 8.2 Gbits when the AP transmits to one VG per BI, and was found to be increased on average to about 10.64 Gbits when the AP transmits to two VGs per BI. The simulations further found that the time saved when the AP transmits to one VG per BI is approximately 18.5%, and approximately 49% n the AP transmits to two VGs per BI.

The present disclosure describes example methods for beamforming, which may be backwards compatible with the beamforming MAC protocol defined in the IEEE 802.11ad standard. Various examples provide an approach, using VGs, that enable simultaneous transmission to selected STAs and mitigate the multi-user interference with a reduction of calculation overhead to the system. Example simulation results illustrate that examples of the VG approach may help to improve system throughput and may also reduce the allocated time of the service periods by reducing the beamforming time without adding extra feedback overhead to the system. The methods and systems described herein may also be suitable for enabling multi-user simultaneous transmission for other applications.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for simultaneous transmission between a transmitter and a plurality of receivers, the method comprising:
    at the transmitter, receiving information identifying respective preferred transmission sectors for transmission from the transmitter to each receiver;

at the transmitter, transmitting a first multi-user simultaneous transmission to a first set of two or more receivers, the first set of receivers being selected for the first set by identifying that the preferred transmission sectors for transmission to the first set of receivers are included in a first virtual grouping of two or more transmission sectors, the two or more transmission sectors belonging to the first virtual grouping being defined by the transmitter; and at the transmitter, transmitting a second multi-user simultaneous transmission to a second set of two or more receivers, the second set of receivers being selected for the second set by identifying that the preferred transmission sectors for transmission to the second set of receivers are included in a second virtual grouping, the second virtual grouping having at least one transmission sector not included in the first virtual grouping.

2. The method of claim 1, wherein the first virtual grouping is defined as a first grouping of two or more virtual sectors, each virtual sector being defined as a respective grouping of two or more adjacent transmission sectors, wherein transmission from the transmitter to a given virtual sector is orthogonal to transmission from the transmitter to any other virtual sector of the first virtual grouping.

3. The method of claim 2, wherein the first set of receivers are selected by identifying that the preferred transmission sectors for transmission to the selected receivers are included in the one or more virtual sectors.

4. The method of claim 2, wherein the first virtual grouping has four virtual sectors, each virtual sector being defined in a different quadrant about the transmitter.

5. The method of claim 2, wherein two or more receivers have been identified as belonging to a single virtual sector, the method further comprising selecting only one receiver for the single virtual sector.

6. The method of claim 5, wherein the one receiver is selected based on an evaluation of path-loss.

7. The method of claim 1, wherein the multi-user simultaneous transmission to the first set of receivers is part of performing multi-beam refinement simultaneously between the transmitter and the selected receivers.

8. The method of claim 1, wherein the first multi-user simultaneous transmission is transmitted during a first beacon interval and the second multi-user simultaneous transmission is transmitted during a second beacon interval.

9. The method of claim 1, wherein the first multi-user simultaneous transmission is transmitted during a first time slot of a beacon interval and the second multi-user simultaneous transmission is transmitted during a second time slot of the beacon interval.

10. The transmitter of claim 1, wherein the first multi-user simultaneous transmission is transmitted during a first beacon interval and the second multi-user simultaneous transmission is transmitted during a second beacon interval.

11. The transmitter of claim 1, wherein the first multi-user simultaneous transmission is transmitted during a first time slot of a beacon interval and the second multi-user simultaneous transmission is transmitted during a second time slot of the beacon interval.

12. A transmitter for simultaneous transmission with a plurality of receivers, the transmitter comprising a processing device executing instructions to cause the transmitter to:

receive information identifying respective preferred transmission sectors for transmission from the transmitter to each receiver;

transmit a first multi-user simultaneous transmission to a first set of two or more receivers, the first set of receivers being selected for the first set by identifying that the preferred transmission sectors for transmission to the first set of receivers are included in a first virtual grouping of two or more transmission sectors, the two or more transmission sectors belonging to the first virtual grouping being defined by the transmitter; and transmit a second multi-user simultaneous transmission to a second set of two or more receivers, the second set of receivers being selected for the second set by identifying that the preferred transmission sectors for transmission to the second set of receivers are included in a second virtual grouping, the second virtual grouping having at least one transmission sector not included in the first virtual grouping.

13. The transmitter of claim 12, wherein the first virtual grouping is defined as a first grouping of two or more virtual sectors, each virtual sector being defined as a respective grouping of two or more adjacent transmission sectors, wherein transmission from the transmitter to a given virtual sector is orthogonal to transmission from the transmitter to any other virtual sector of the first virtual grouping.

14. The transmitter of claim 13, wherein the first set of receivers are selected by identifying that the preferred transmission sectors for transmission to the selected receivers are included in the one or more virtual sectors.

15. The transmitter of claim 13, wherein the first virtual grouping has four virtual sectors, each virtual sector being defined in a different quadrant about the transmitter.

16. The transmitter of claim 13, wherein two or more receivers have been identified as belonging to a single virtual sector, wherein the instructions further cause the transmitter to select only one receiver for the single virtual sector.

17. The transmitter of claim 16, wherein the one receiver is selected based on an evaluation of path-loss.

18. The transmitter of claim 12, wherein the multi-user simultaneous transmission to the first set of receivers is part of performing multi-beam refinement simultaneously between the transmitter and the selected receivers.

19. A computer readable medium comprising a memory storing thereon computer executable instructions for simultaneous transmission between a transmitter and a plurality of receivers, wherein the instructions, when executed by the transmitter, cause the transmitter to:

receive information identifying respective preferred transmission sectors for transmission from the transmitter to each receiver;

transmit a first multi-user simultaneous transmission to a first set of two or more receivers, the first set of receivers being selected for the first set by identifying that the preferred transmission sectors for transmission to the first set of receivers are included in a first virtual grouping of two or more transmission sectors, the two or more transmission sectors belonging to the first virtual grouping being defined by the transmitter; and transmit a second multi-user simultaneous transmission to a second set of two or more receivers, the second set of receivers being selected for the second set by identifying that the preferred transmission sectors for transmission to the second set of receivers are included in a second virtual grouping, the second virtual grouping having at least one transmission sector not included in the first virtual grouping.

* * * * *